(12) United States Patent
Yeoum et al.

(10) Patent No.: US 10,237,803 B2
(45) Date of Patent: Mar. 19, 2019

(54) ELECTRONIC DEVICE AND CALL PROCESSING METHOD THEREOF

(71) Applicant: Samsung Electronics Co., Ltd., Gyeonggi-do (KR)

(72) Inventors: Tae Sun Yeoum, Seoul (KR); Hyong Jin Ban, Gyeonggi-do (KR); Yoon Sung Nam, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/137,766

(22) Filed: Apr. 25, 2016

(65) Prior Publication Data

US 2016/0316414 A1  Oct. 27, 2016

(30) Foreign Application Priority Data

Apr. 23, 2015  (KR) .................. 10-2015-0057383

(51) Int. Cl.
*H04M 1/00* (2006.01)
*H04W 36/36* (2009.01)
(Continued)

(52) U.S. Cl.
CPC ....... *H04W 36/365* (2013.01); *H04L 65/1016* (2013.01); *H04L 65/1073* (2013.01);
(Continued)

(58) Field of Classification Search
CPC ........ H04M 3/58; H04L 67/14; H04L 67/148; H04L 67/143; H04L 29/08603; H04L 29/08639; H04L 65/1096
(Continued)

(56) References Cited

U.S. PATENT DOCUMENTS

| 7,403,795 B1* | 7/2008 | Chapman, Jr. ........ H04W 84/14 |
| | | 379/225 |
| 7,751,546 B2 | 7/2010 | Poustchi et al. |

(Continued)

FOREIGN PATENT DOCUMENTS

| EP | 2 093 968 | 8/2009 |
| EP | 2 139 213 | 12/2009 |
| EP | 2 819 374 | 12/2014 |

OTHER PUBLICATIONS

International Search Report dated Jul. 26, 2016 issued in counterpart application No. PCT/KR2016/004263, 9 pages.

(Continued)

*Primary Examiner* — Dai Phuong
(74) *Attorney, Agent, or Firm* — The Farrell Law Firm, P.C.

(57) ABSTRACT

An electronic device and method thereof are provided. The electronic device includes a communication module configured to communicate with a communication server; an input module configured to receive a user command; and a processor configured to receive a device changing command, via the input module, during a call between the electronic device and a first external electronic device, and transmit, to the communication server, via the communication module, a message for changing the call between the electronic device and the first external electronic device to a call between a second external electronic device and the first external electronic device. The second external electronic device uses a same subscription information as the electronic device, and the message includes call state information of the call between the electronic device and the first external electronic device.

5 Claims, 15 Drawing Sheets

(51) Int. Cl.
  *H04L 29/06* (2006.01)
  *H04M 3/58* (2006.01)
  *H04M 1/725* (2006.01)
  *H04W 36/00* (2009.01)

(52) U.S. Cl.
  CPC ...... *H04L 65/1083* (2013.01); *H04L 65/1096* (2013.01); *H04M 1/72583* (2013.01); *H04M 3/58* (2013.01); *H04W 36/0016* (2013.01); *H04M 1/7253* (2013.01)

(58) Field of Classification Search
  USPC ..... 455/412.1–420, 421, 452.2, 456.1–456.3
  See application file for complete search history.

(56) References Cited

U.S. PATENT DOCUMENTS

| | | | |
|---|---|---|---|
| 7,840,681 B2 | 11/2010 | Acharya et al. | |
| 8,089,934 B2 | 1/2012 | Long et al. | |
| 8,767,938 B2* | 7/2014 | Wurster | H04M 3/436 379/207.02 |
| 8,830,959 B2 | 9/2014 | Long et al. | |
| 9,100,488 B2 | 8/2015 | Lovitt et al. | |
| 9,253,318 B2 | 2/2016 | Lim et al. | |
| 2004/0001589 A1* | 1/2004 | Mueller | H04M 1/03 379/433.01 |
| 2004/0204119 A1* | 10/2004 | Ho | H04M 1/274575 455/564 |
| 2004/0223601 A1* | 11/2004 | Culli | H04M 3/54 379/221.13 |
| 2005/0021872 A1 | 1/2005 | Poustchi et al. | |
| 2006/0026288 A1 | 2/2006 | Acharya et al. | |
| 2007/0071226 A1* | 3/2007 | Neuhaus | H04L 29/06 379/355.02 |
| 2008/0057962 A1 | 3/2008 | Long et al. | |
| 2009/0210536 A1* | 8/2009 | Allen | H04M 3/58 709/227 |
| 2009/0303310 A1* | 12/2009 | Zhang | H04M 3/42017 348/14.02 |
| 2009/0325587 A1* | 12/2009 | Suginaka | H04M 3/42263 455/450 |
| 2011/0014903 A1* | 1/2011 | Krischker | H04M 1/57 455/418 |
| 2011/0021200 A1* | 1/2011 | Yi | H04L 65/1016 455/442 |
| 2012/0063420 A1 | 3/2012 | Long et al. | |
| 2012/0170726 A1* | 7/2012 | Schwartz | H04M 3/38 379/93.02 |
| 2013/0013735 A1* | 1/2013 | Kim | H04N 7/173 709/217 |
| 2013/0078964 A1* | 3/2013 | Jin | H04W 4/16 455/414.1 |
| 2013/0117457 A1* | 5/2013 | Allen | H04M 3/58 709/227 |
| 2014/0179294 A1 | 6/2014 | Liu | |
| 2014/0223470 A1* | 8/2014 | Kim | H04N 21/4131 725/32 |
| 2014/0256298 A1* | 9/2014 | Moss | H04W 4/12 455/414.1 |
| 2014/0274008 A1* | 9/2014 | Olodort | H04M 1/006 455/417 |
| 2014/0287728 A1 | 9/2014 | Um et al. | |
| 2014/0369483 A1 | 12/2014 | Lovitt et al. | |
| 2015/0055653 A1 | 2/2015 | Suryavanshi | |
| 2015/0063554 A1 | 3/2015 | Hsiao et al. | |
| 2015/0296355 A1 | 10/2015 | Lovitt et al. | |
| 2016/0100061 A1* | 4/2016 | Lazaridis | H04M 3/543 455/417 |
| 2017/0310806 A1* | 10/2017 | Zhang | H04M 1/725 |

OTHER PUBLICATIONS

European Search Report dated Oct. 7, 2016 issued in counterpart application No. 16166607.8-1972, 10 pages.

* cited by examiner

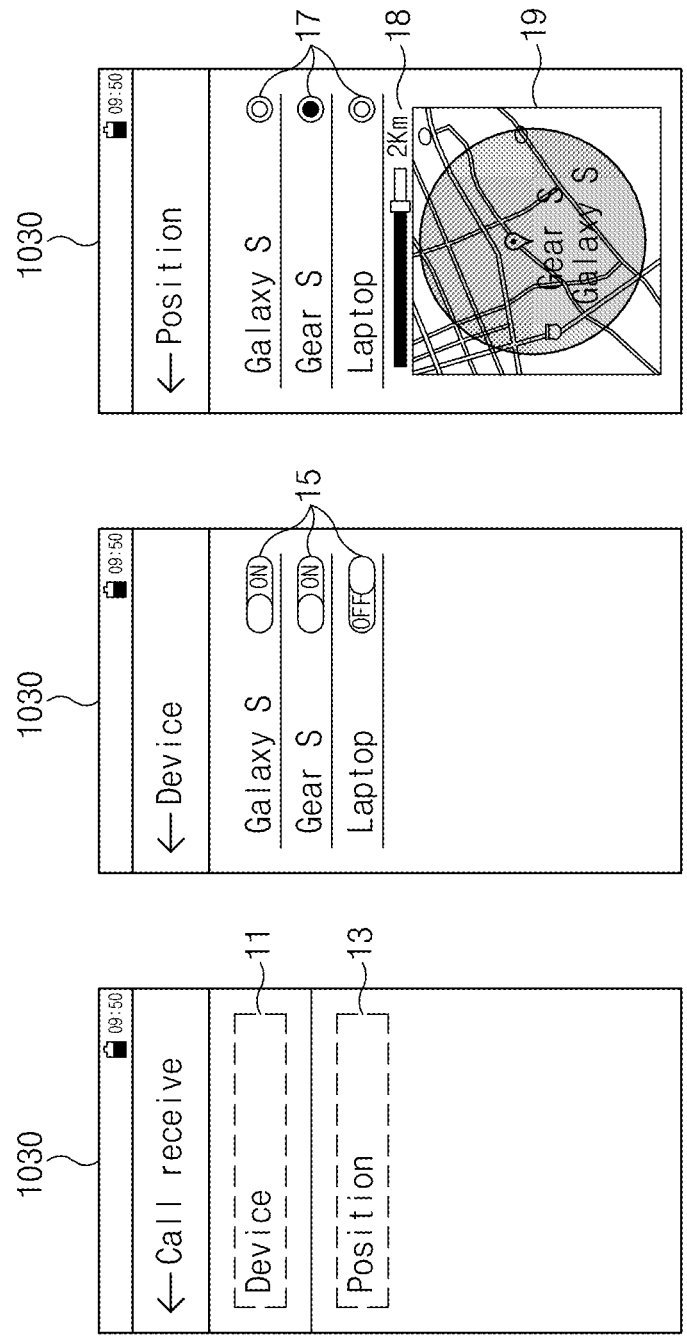

ELECTRONIC DEVICE AND CALL PROCESSING METHOD THEREOF

PRIORITY

This application claims priority under 35 U.S.C. § 119(a) to Korean Patent Application Serial No. 10-2015-0057383, which was filed in the Korean Intellectual Property Office on Apr. 23, 2015, the entire disclosure of which is incorporated herein by reference.

BACKGROUND

1. Field of the Disclosure

The present disclosure relates generally to a call processing method of an electronic device registered in an internet protocol (IP) multimedia subsystem (IMS) network.

2. Description of the Related Art

To interwork with various communication systems, an IMS has been provided. IMS refers to a specification providing a multimedia service, such as voice, audio, video, etc., based on an IP. IMS is also being extended to support the interworking of various wireless/wired networks based on an IP.

In a conventional circuit-switch (CS) network, a phone number is used to transfer a call to a subscriber, where only one phone number is used in one device (or one subscriber identification module (SIM) card). Accordingly, it is impossible to allocate the same phone number in several terminals. For example, when a user of a smartphone additionally purchases a smart watch that utilizes 3G communication, the user must use different phone numbers in the smartphone and smart watch, respectively.

Further, when using a call forwarding method in a wireless communication network, a call received in a smartphone may be transferred to a smart watch, but a user should previously set the smartphone as the call receiving device in the communication network. Accordingly, a user cannot variably select among difference devices to receive a call, when the call is received.

SUMMARY

The present disclosure is made to address at least the above-mentioned problems and/or disadvantages and to provide at least the advantages described below.

Accordingly, an aspect of the present disclosure is to provide a method for a plurality of electronic devices to use one phone number based on an IMS and to conveniently use one phone number through the limiting of a call transfer, the reception call, etc.

In accordance with an aspect of the present disclosure, an electronic device is provided, which includes a communication module configured to communicate with a communication server; an input module configured to receive a user command; and a processor configured to receive a device changing command, via the input module, during a call between the electronic device and a first external electronic device, and transmit, to the communication server, via the communication module, a message for changing the call between the electronic device and the first external electronic device to a call between a second external electronic device and the first external electronic device. The second external electronic device uses a same subscription information as the electronic device, and the message includes call state information of the call between the electronic device and the first external electronic device.

In accordance with an aspect of the present disclosure, a call processing method of an electronic device is provided, which includes establishing a call between the electronic device and a first external electronic device through a communication network; receiving, by the electronic device, a device changing command from a user during the call between the electronic device and the first external electronic device; and transmitting, to the communication server, a message for changing the call between the electronic device and the first external electronic device to a call between a second external electronic device and the first external electronic device. The second external electronic device uses a same subscription information as the electronic device, and the message comprising call state information of the call between the electronic device and the first external electronic device.

In accordance with an aspect of the present disclosure, an electronic device is provided, which includes a display; a communication module configured to receive, from a communication server, a message including call state information of a call between a first external electronic device and a second external electronic device, wherein the second external electronic device uses a same subscription information as the electronic device; and a processor configured to display, on the display, a user interface indicating a state of a call between the electronic device and the first external electronic device using the call state information, if the call between the first external electronic device and the second external electronic device is changed to the call between the electronic device and the first external electronic device.

In accordance with an aspect of the present disclosure, a call processing method of an electronic device is provided, which includes receiving, from a communication server, a message including call state information of a call between a first external electronic device and a second external electronic device, wherein the second external electronic device uses a same subscription information as the electronic device; changing the call between the first external electronic device and the second external electronic device to a call between the electronic device and the first external electronic device; and displaying, on a display, a user interface indicating a state of the call between the electronic device and the first external electronic device using the call state information.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 11A to 11C are diagrams illustrating a user interface displayed on an electronic device according to an embodiment of the present disclosure;

DETAILED DESCRIPTION

Figure 1:
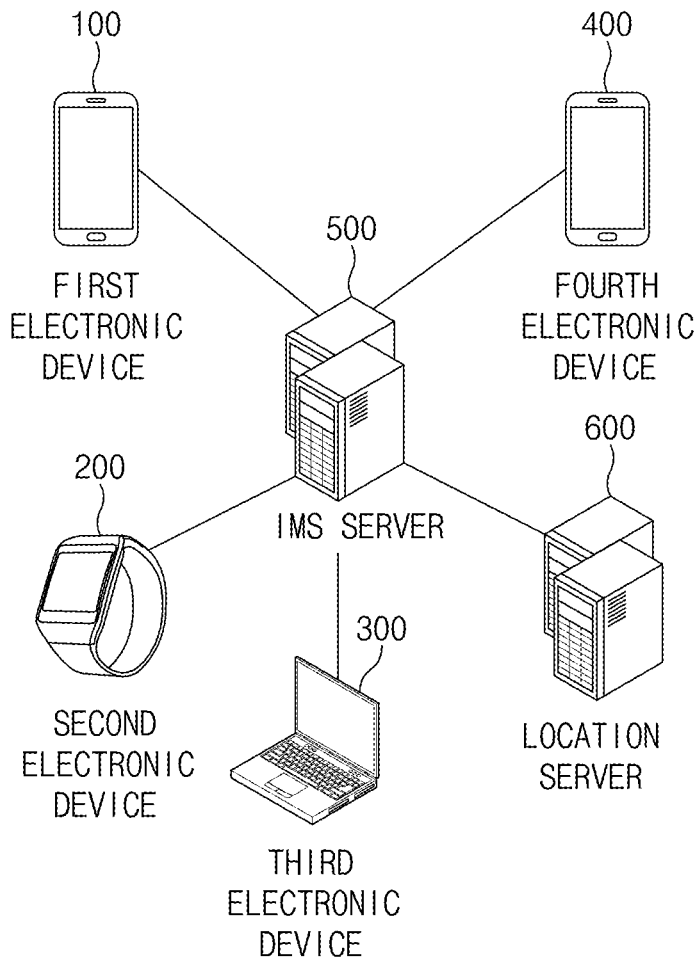
FIG. 1 illustrates an IMS system according to an embodiment of the present disclosure.

Various embodiments of the present disclosure are described below with reference to accompanying drawings. Accordingly, those of ordinary skill in the art will recognize that modification, equivalent, and/or alternative on the various embodiments described herein can be made without departing from the scope and spirit of the present disclosure. With regard to the description of the drawings, similar elements may be designated by similar reference numerals.

Terms and expressions used in this specification are used to describe certain embodiments of the present disclosure and are not intended to limit the scope of the present disclosure.

The terms of a singular form may include plural forms unless otherwise specified. Unless otherwise defined herein, all terms used herein, which include technical or scientific terms, may have the same meanings that are generally understood by a person skilled in the art. Terms defined in a dictionary and commonly used should also be interpreted as is customary in the relevant related art and not in an idealized or overly formal way unless expressly so defined as such herein. In some cases, even if terms are defined in the specification, these terms may still not be interpreted to exclude embodiments of the present disclosure.

Herein, the expressions "have", "may have", "include" and "comprise", or "may include" and "may comprise" indicate the existence of corresponding features (e.g., elements such as numeric values, functions, operations, or components) but do not exclude presence of additional features.

The expressions "A or B", "at least one of A or/and B", "one or more of A or/and B", etc., may include any and all combinations of one or more of the associated listed items. For example, the expression "A or B", "at least one of A and B", or "at least one of A or B" may refer to (1) where at least one A is included, (2) where at least one B is included, or (3) where both of at least one A and at least one B are included.

Terms, such as "first", "second", etc., may refer to various elements, but do not limit the elements. For example, "a first user device" and "a second user device" may indicate different user devices regardless of the order or priority thereof. Further, without departing from the scope of the present disclosure, a first element may be referred to as a second element, and similarly, a second element may be referred to as a first element.

When an element (e.g., a first element) is referred to as being "(operatively or communicatively) coupled with/to" or "connected to" another element (e.g., a second element), the first element may be directly coupled with/to or connected to the second element or an intervening element (e.g., a third element) may be present therebetween. However, when the first element is referred to as being "directly coupled with/to" or "directly connected to" the second element, there are no intervening elements therebetween.

According to context, the expression "configured to" may be used interchangeably with "suitable for", "having the capacity to", "designed to", "adapted to", "made to", or "capable of". The expression "configured to" should not mean only "specifically designed to" in hardware. Instead, the expression "a device configured to" may mean that the device is "capable of" operating together with another device or other components. For example, a "processor configured to (or set to) perform A, B, and C" may indicate a dedicated processor (e.g., an embedded processor) for performing a corresponding operation or a generic-purpose processor (e.g., a central processing unit (CPU) or an application processor) that performs corresponding operations by executing one or more software programs stored in a memory device.

An electronic device according to an embodiment of the present disclosure may include a smartphone, a tablet personal computer (PC), a mobile phone, a video telephone, an electronic book reader, a desktop PC, a laptop PC, a netbook computer, a workstation, a server, a personal digital assistants (PDA), a portable multimedia player (PMP), a Motion Picture Experts Group (MPEG-1 or MPEG-2) Audio Layer 3 (MP3) player, a mobile medical device, a camera, or a wearable device. For example, a wearable device may include an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., an implantable circuit).

An electronic device may also be a home appliance, such as a television (TV), a digital versatile disc (DVD) player, an audio device, a refrigerator, an air conditioner, a cleaner, an oven, a microwave oven, a washing machine, an air cleaner, a set-top box, a TV box (e.g., Samsung HomeSync®, Apple TV®, or Google TV®), a game console (e.g., Xbox® and PlayStation®), an electronic dictionary, an electronic key, a camcorder, or an electronic picture frame.

An electronic devices may also be a medical device (e.g., a portable medical measurement device, such as a blood glucose monitoring device, a heartbeat measuring device, a blood pressure measuring device, a body temperature measuring device, etc., a magnetic resonance angiography (MRA) device, a magnetic resonance imaging (MRI) device, a computed tomography (CT) device, a scanner, and an ultrasonic device), a navigation device, a global positioning system (GPS) receiver, an event data recorder (EDR), a flight data recorders (FDR), a vehicle infotainment device, an electronic device for a vessel (e.g., navigation systems and gyrocompasses), avionics, a security device, a head unit for a vehicle, an industrial or home robots, an automatic teller machine (ATM), a point of sales (POS) device, or an Internet of Things (IoT) device (e.g., a light bulb, a sensor, an electric or gas meter, a sprinkler device, a fire alarm, a thermostat, a street lamp, a toaster, an exercise device, a hot water tank, a heater, a boiler, etc.).

An electronic device may also include parts of furniture or buildings/structures, electronic boards, electronic signature receiving devices, projectors, or various measuring instruments (e.g., water meters, electricity meters, gas meters, wave meters, etc.).

An electronic device may also be a flexible electronic device.

Further, an electronic device may be one of the above-described devices or a combination thereof, or another electronic device.

Herein, the term "user" may refer to a person who uses an electronic device or may refer to a device (e.g., an artificial intelligence electronic device) that uses an electronic device.

FIG. 1 illustrates a communication system according to an embodiment of the present disclosure.

Referring to FIG. 1, the communication system, e.g., an IMS, includes a first electronic device 100, a second electronic device 200, a third electronic device 300, a fourth electronic device 400, an IMS server 500 (or a communication server), and a location server 600. The first electronic device 100, the second electronic device 200, the third electronic device 300, the fourth electronic device 400, the IMS server 500, and the location server 600 are connected to and may communicate with one another through a network, e.g., an IMS network (or communication network).

Each of the first electronic device 100, the second electronic device 200, the third electronic device 300, and the fourth electronic device 400 may be implemented with a device capable of transmitting and receiving communication data (e.g., voice or video data), such as a smart watch, a smart glass, a tablet PC, a laptop PC, a desktop PC, a smart TV, etc.

The first electronic device 100, the second electronic device 200, the third electronic device 300, and the fourth electronic device 400 may transmit and receive communication data (e.g., voice or video data) through the IMS server 500 and may provide an IMS call service to a user using the communication data. For example, the first electronic device 100, the second electronic device 200, the third electronic device 300, and the fourth electronic device 400 may support a public switched telephone network (PSTN), a web real-time communication (WebRTC), a voice over LTE (VoLTE), and/or an IMS centralized service (ICS). A device supporting WebRTC may interwork with the IMS network through a WebRTC-SIP conversion gateway, or a device using a 3rd generation (3G) CS network may perform an IMS call through a session centralization and continuity application server (SCC AS).

The first electronic device 100, the second electronic device 200, and the third electronic device 300 may perform an IMS call using an IMS public identity (IMPU) of the same subscription information form (e.g., a phone number or uniform resource identifier (URI)). That is, the first electronic device 100, the second electronic device 200, and the third electronic device 300 are registered in an IMS server with the same subscription information.

Although the example in FIG. 1 illustrates three electronic devices using the same subscription information (the first electronic device 100, the second electronic device 200, and the third electronic device 300), the number of electronic devices that uses the same subscription information is not limited thereto. If the number of electronic devices that use the same subscription information is greater than or equal to two, the present disclosure may be applied thereto.

The fourth electronic device 400 may be registered in the IMS network using subscription information different from that of each of the first to third electronic devices 100 to 300. Accordingly, a user of the fourth electronic device 400 may make a call to a user of the first to third electronic device 300 through the IMS network.

The IMS server 500 may register an electronic device in the IMS network, process the transmitting and receiving of a call, and provide an IMS call service to a user of the electronic device. For example, the IMS server 500 may include a call session control function (xCSCF), a home subscribe server (HSS), a media gateway control function (MGCF), a breakout gateway control function (BGCF), an interconnection border control function (IBCF), and an application server (AS). The xCSCF may register an electronic device in the IMS network, process a session initiation protocol (SIP) signaling used when the electronic device registered in the IMS network transmits and receives an IMS call, and perform SIP routing using an AS, based on a kind of service or to process non-SIP service.

The HSS may be a central database for the IMS network subscriber (or subscription electronic device) and may manage the profile of a subscriber, a service profile, etc.

Each of the MGCF, the BGCF, and the IBCF may interwork with and manage a PSTN or another IMS network (e.g., VoLTE).

The AS may provide various types of services to a user and may process a call connection continuity function, a group and list management, service capability integration, a telephony application service, etc.

The location server 600 may manage position information of devices registered in the IMS network. Alternatively, the location server 600 may be an AS of the IMS server 500. If the positions of devices registered in the IMS network change, the location server 600 may receive and update the changed position information through the IMS server 500 (e.g., xCSCF).

Figure 2:
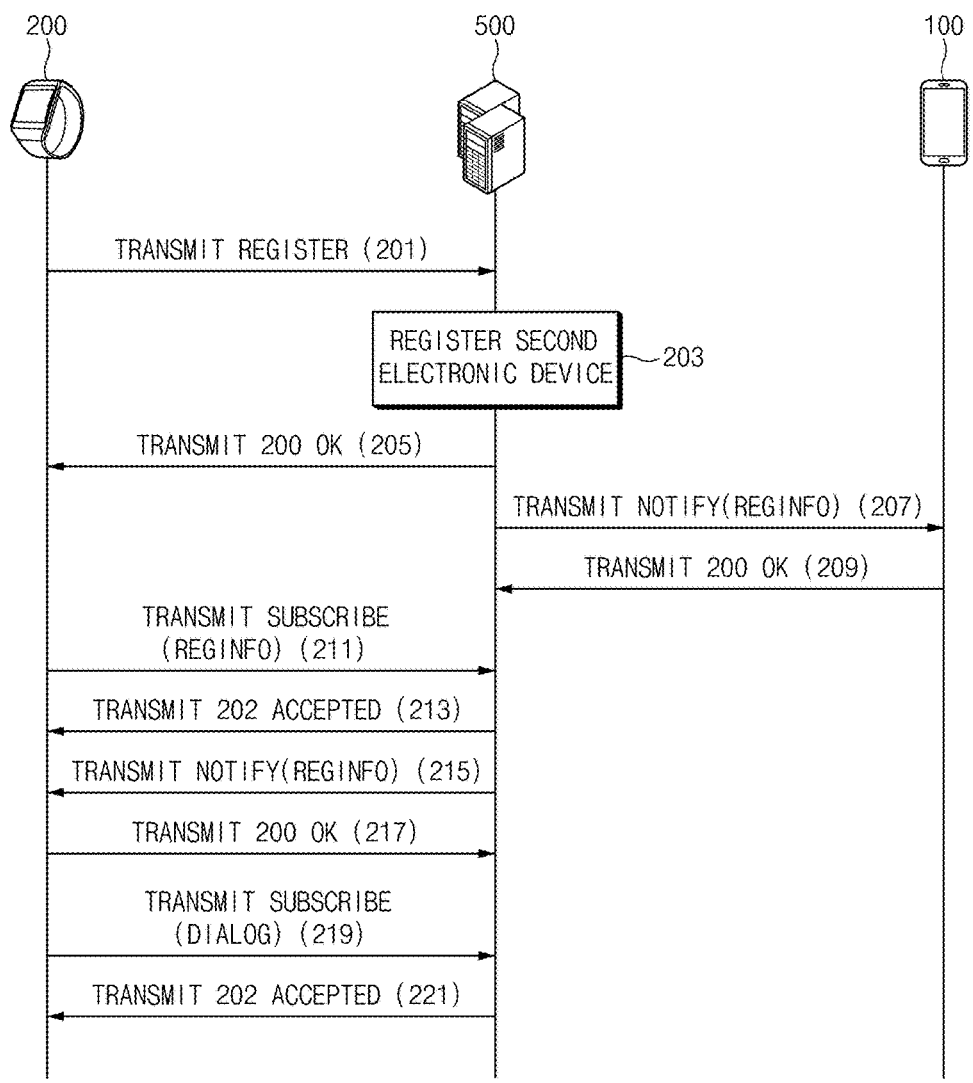
FIG. 2 is a signal flow diagram illustrating a procedure of registering an IMS service by an electronic device according to an embodiment of the present disclosure.

FIG. 2 is a signal flow diagram illustrating a procedure of registering an IMS service by an electronic device according to an embodiment of the present disclosure. Specifically, FIG. 2 illustrates a procedure in which the second electronic device 200 is registered with the same subscription information (e.g., IMPU) as the first electronic device 100, which is already registered in an IMS network.

Referring to FIG. 2, in step 201, the second electronic device 200 transmits a REGISTER request (or registration request) to the IMS server 500.

In step 203, the IMS server 500 performs an authentication procedure for the second electronic device 200 and registers the second electronic device 200 in the IMS network. According to an embodiment of the present disclosure, the second electronic device 200 may be registered with the same subscription information as the first electronic device 100.

In step 205, the IMS server 500 transmits a 200 OK response to the second electronic device 200.

In step 207, the IMS server 500 transmits a NOTIFY message (or notification message) to the first electronic device 100. For example, the IMS server 500 may transmit a NOTIFY message, in which 'reginfo' (or registration information) is stored, to all devices (e.g., the first electronic device 100) that use the same subscription information. The 'reginfo' may have an extensible markup language (XML)

form and may include a contact tag corresponding to the number of devices registered with the same subscription information. Each contact tag may include a URI tag including the registered IMPU and a display name tag that indicates device identification information (e.g., a globally routable user agent URI (GRUU)) for identifying each terminal and a kind of terminal. For example, a display name may include the name of a device such as Galaxy S®, Gear S®, etc.

An electronic device registered in the IMS network, e.g., the first electronic device 100, may display a list including electronic devices that use the same subscription information as that of the registered electronic device, e.g., the second electronic device 200, using the display name.

Table 1 below indicates an example of 'reginfo' included in a NOTIFY message.

TABLE 1

```
<?xml version="1.0"?>
<reginfo                xmlns="urn:ietf:params:xml.ns:reginfo"
xmlns:gr="urn:ietf:params:xml:ns:gruuinfo" version="0" state="full">
<registration aor="sip:01095309999@192.168.150.1"
id="0x7f3f8044b220"
state="active">
<contact id="0x7f3f8044aed0" state="active" event="registered"
expires="47"
callid="ehkiqo1smp98bpqfath900" cseq="107"
received="sip:192.168.150.14:34257;transport=WS"
path="" user_agent="secwebrtc/0.0.1 (SIP.js/0.6.0);
SAMSUNG SM-R750">
<uri>sip:kigtk9uh@g0lho2hvvubk.invalid;transport=ws</uri>
<unknown-param   name="+sip.instance">"<urn:uuid:
0808d37f-ee9a-40eb-8196-39aaa098dabc>"</unknown-param>
<gr:pub-gruu     uri="sip:01095309999@192.168.150.1;
gr=urn:uuid:0808d37f-ee9a-40eb-8196-39aaa098dabc"/>
<display-name>"Gear S"</display-name>
</contact>
<contact id="0x7f3f83b0d4e0" state="active" event="created"
expires="3600"
callid="OfAyjtqZy980mdHITxQJFw.." cseq="1"
received="" path="" user_agent="T-Mobile VoLTEePDG
SEC/4.4.4 NI9">
<uri>sip:01095309999@192.168.150.13:5060</uri>
<unknown-param name="+sip.instance">"<urn:gsma:imei:
35459406-002349-0>"</unknown-param>
<gr:pub-gruu
uri="sip:01095309999@192.168.150.1;gr=urn:gsma:imei:
35459406-002349-0"/>
<display-name>"Galaxy S"</display-name>
</contact>
</registration>
</reginfo>
```

In step 209, the first electronic device 100 transmits the 200 OK response, in response to the received NOTIFY message.

In step 211, the second electronic device 200 transmits, to the IMS server 500, a SUBSCRIBE message about a 'reginfo' event.

In step 213, the IMS server 500 transmits a 202 ACCEPTED response to the second electronic device 200, in response to the SUBSCRIBE message. Accordingly, if an event associated with a 'reginfo' occurs (e.g., the registration of a device that uses the same subscription information, the change of the registered information, etc.), the second electronic device 200 may receive 'reginfo' from the IMS server 500.

In step 215, the IMS server 500 transmits a NOTIFY message including the 'reginfo'.

In step 217, the second electronic device 200 transmits a 200 OK response to the IMS server 500, in response to the NOTIFY message.

In step 219, the second electronic device 200 transmits a SUBSCRIBE message about a dialog event to the IMS server 500.

In step 221, the IMS server 500 transmits a 202 ACCEPTED message to the second electronic device 200.

Accordingly, when the states of any INVITE-initiated SIP dialogs connected to the same subscription information (e.g., IMPU) changes, the second electronic device 200 may receive the NOTIFY message including dialog event information from the IMS server 500 and may recognize the call state of another device.

An electronic device registered in the IMS network using the dialog event may display the state of an electronic device that uses the same subscription information as that of the registered electronic device.

Figure 3:
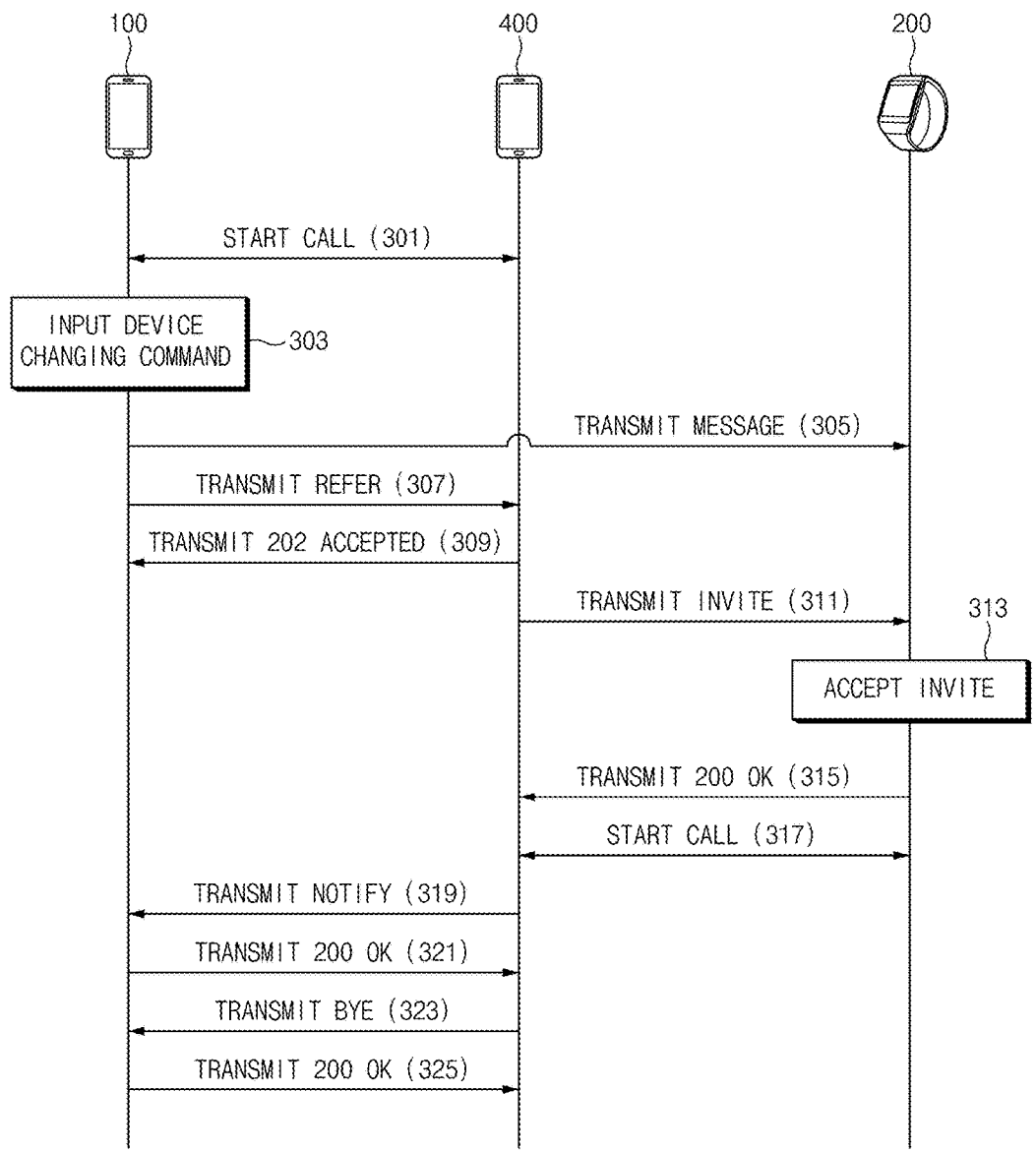
FIG. 3 is a signal flow diagram illustrating a procedure of changing a device during a call, according to an embodiment of the present disclosure.

FIG. 3 is a signal flow diagram illustrating a procedure of changing a device during a call, according to an embodiment of the present disclosure. Specifically, FIG. 3 indicates the first electronic device 100 changing a phone device (or transferring a call) to the second electronic device 200, which uses the same subscription information as the first electronic device 100, during the call, based on a user command input in the first electronic device 100.

Referring to FIG. 3, in step 301, a call is established between the first and fourth electronic devices 100 and 400.

During the call, in step 303, a device changing command (or call transfer command) is input to the first electronic device 100. For example, a user of the first electronic device 100 may input a user command for changing a device for making the call, from the first electronic device 100 to the second electronic device 200.

In step 305, the first electronic device 100 transmits a 'MESSAGE' message to the second electronic device 200. For example, a GRUU of the second electronic device 200 may be designated as URI, and the first electronic device 100 may transmit a 'MESSAGE' message to the second electronic device 200. The 'MESSAGE' message may include the IMPU or the GRUU of the first electronic device 100, information indicating that a call transfer of the call between the first and fourth electronic devices 100 and 400 is scheduled, and/or call state information of the call between the first and fourth electronic devices 100 and 400. For example, the call state information may include at least one of a talk time (e.g., a point in time for starting a call or an elapsed time), information about a called party (e.g., a name stored in a contact list or an image of a user of the fourth electronic device 400), and an initial call connection direction (e.g., caller and receiver about a call).

Alternatively, step 305 may be omitted.

In step 307, the first electronic device 100 transmits a REFER request (or a call transfer request) to the fourth electronic device 400. For example, the GRUU of the second electronic device 200 that receives a call may be included in a Refer-To header included in the REFER message.

In step 309, the fourth electronic device 400 transmits a 202 ACCEPTED response to the first electronic device 100.

In step 311, the fourth electronic device 400 designates the GRUU included in the Refer-To header of the REFER as URI and transmits an INVITE message (or a call invitation message) to the second electronic device 200. The IMPU or the GRUU of the first electronic device 100 requesting the REFER message may be included in a Referred-By header included in the INVITE message. The call state information of the call between the first and fourth electronic devices 100 and 400 may also be included in the INVITE message.

In step 313, the second electronic device 200 accepts the INVITE message (or a call). For example, when the 'MESSAGE' message is received from the first electronic device 100, the second electronic device 200 may determine whether the IMPU or the GRUU included in the Referred-By header of the INVITE message is the same as the IMPU or the GRUU included in the 'MESSAGE' message. When the IMPU or the GRUU included in the Referred-By header of the INVITE message is the same as the IMPU or the GRUU included in the 'MESSAGE' message, the second electronic device 200 may accept the INVITE message, without receiving a call accepting command from a user.

Alternatively, when the 'MESSAGE' message is not received or sent from the first electronic device 100, the second electronic device 200 may determine whether the IMPU included in the Referred-By header of the INVITE message is the same as the IMPU of the second electronic device 200. When the IMPU included in the Referred-By header of the INVITE message is the same as the IMPU of the second electronic device 200, the second electronic device 200 may accept the INVITE message, without receiving a call accepting command from a user.

In step 315, the second electronic device 200 transmits a 200 OK response to the fourth electronic device 400.

In step 317, the call is established between the second and fourth electronic devices 200 and 400.

The second electronic device 200 may provide a user interface indicating a call state using the call state information included in the 'MESSAGE' or INVITE message. That is, even though an electronic device that makes a call is changed from the first electronic device 100 into the second electronic device 200, a user interface originally displayed on the first electronic device 100 may then be displayed on the second electronic device 200. For example, a talk time of the call between the first and fourth electronic devices 100 and 400 may be applied to a talk time for the call between the second and fourth electronic devices 200 and 400.

Further, using the call state information, even though the name of a user of the fourth electronic device 400 is not stored in the second electronic device 200, the second electronic device 200 may display the name of the user of the fourth electronic device 400.

In step 319, the fourth electronic device 400 transmits, to the first electronic device 100, a NOTIFY message indicating that the change of a phone device (or call transfer) is successfully performed.

In step 321, the first electronic device 100 transmits a 200 OK response to the fourth electronic device 400.

In step 323, the fourth electronic device 400 transmits a BYE message to the first electronic device 100, and in step 325, the first electronic device 100 transmits a 200 OK response to the fourth electronic device 400. Accordingly, a call between the first and fourth electronic devices 100 and 400 may be ended.

Although FIG. 3 illustrates that the fourth electronic device 400 transmits the BYE message to the first electronic device 100, alternative, the first electronic device 100 may transmit the BYE message to the fourth electronic device 400, and the call between the first and fourth electronic devices 100 and 400 may be ended.

Alternatively, the operations performed by the fourth electronic device 400 in FIG. 3 may be performed by a back-to-back user agent (B2BUA) AS that performs proxy with respect to a signal of another device in an IMS network. For example, if the fourth electronic device 400 does not support a SIP message for supporting the change of a phone device (or call transfer), the B2BUA AS may perform above-described operations in place of the fourth electronic device 400. The B2BUA may be a user agent that simultaneously perform functions of a user agent server (UAS) and a user agent client (UAC). The B2BUA may be similar to a SIP proxy server that transmits a message between the UAS and the UAC. However, the B2BUA may also differ from the SIP proxy server in that the B2BUA generates and transmits a new SIP dialog based on the received SIP message.

Although the IMS server 500 is not illustrated in FIG. 3, the messages transmitted and received between the first electronic device 100, the second electronic device 200, and the fourth electronic device 400 (e.g., a REFER message, a MESSAGE message, an INVITE message, a NOTIFY message, a 200 OK message, a 202 ACCEPTED message, etc.) may be transmitted and received through the IMS server 500.

Figure 4:
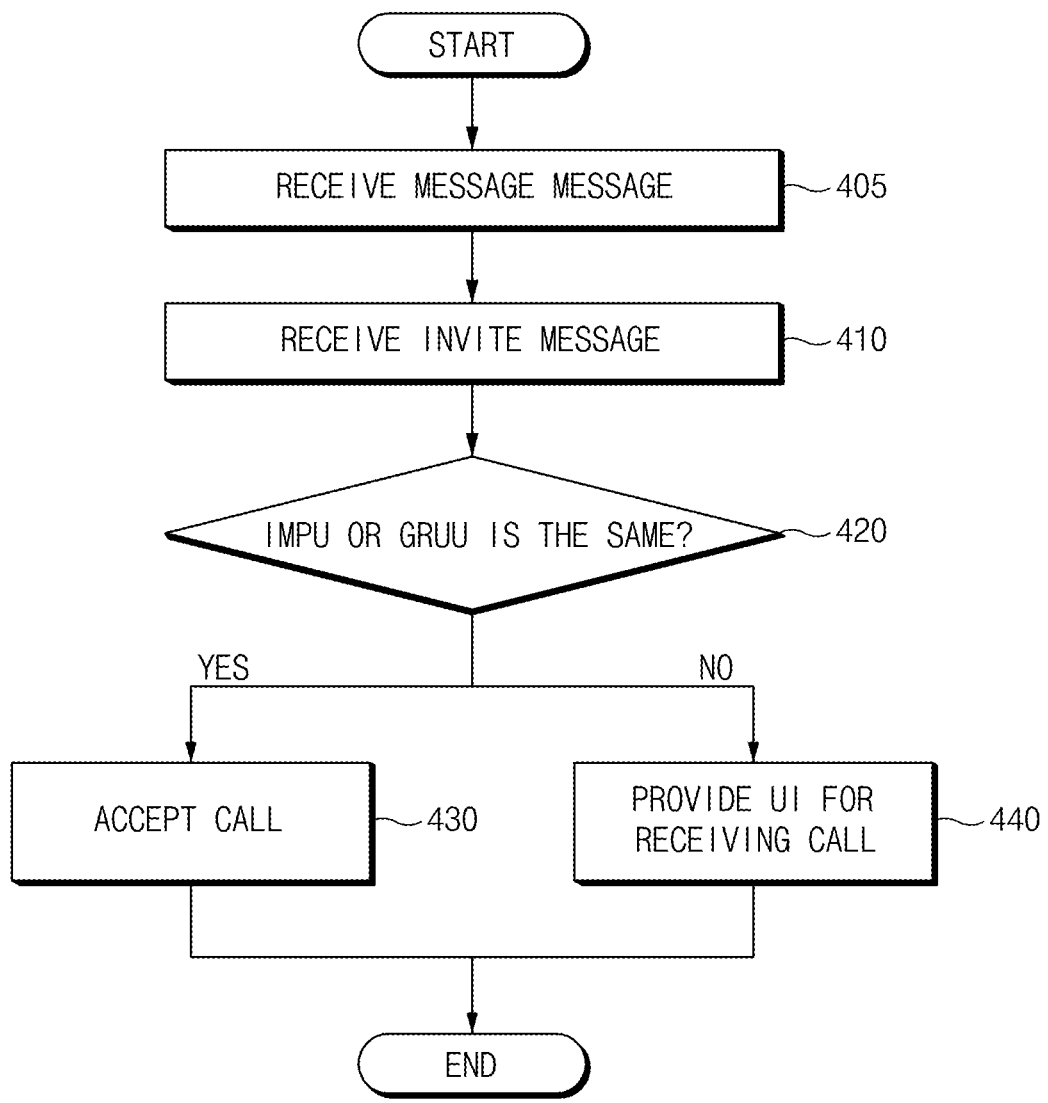
FIG. 4 is a flow chart illustrating a call accepting procedure of an electronic device according to an embodiment of the present disclosure.

FIG. 4 is a flow chart illustrating a call accepting procedure of an electronic device according to an embodiment of the present disclosure. Specifically, FIG. 4 illustrates operations that may be performed by an electronic device receiving an INVITE message for the change of a phone device (or call transfer), e.g., the second electronic device 200 in step 313 of FIG. 3.

Referring to FIG. 4, in step 405, the second electronic device 200 receives a 'MESSAGE' message from an external electronic device (e.g., the first electronic device 100). The 'MESSAGE' message may include information indicating that a call transfer of a current call from an external electronic device is scheduled. The 'MESSAGE' message may include subscription information (e.g., IMPU) or device identification information (e.g., GRUU) of an external electronic device (e.g., the first electronic device 100).

Alternatively, step 405 may be omitted.

In step 410, the second electronic device 200 receives an INVITE message.

In step 420, the second electronic device 200 determines whether the IMPU or the GRUU included in the INVITE message is the same as the IMPU or the GRUU included in the 'MESSAGE' message. For example, when a SIP 'MESSAGE' message is received from the first electronic device 100, the second electronic device 200 may compare the IMPU or the GRUU included in the Referred-By header of the INVITE message with the IMPU or the GRUU included in the SIP 'MESSAGE' message. However, when the SIP 'MESSAGE' message is not received from the first electronic device 100, the second electronic device 200 may compare the IMPU included in the Referred-By header of the INVITE message with the IMPU of the second electronic device 200.

When URI or IMPU included in the Referred-By header of the INVITE message is the same as the IMPU or the GRUU included in the SIP 'MESSAGE' message (or the IMPU of the second electronic device 200) in step 420, the second electronic device 200 accepts the INVITE message in step 430, without receiving a call accepting command from a user. For example, the second electronic device 200 may automatically accept the INVITE message, without displaying a user interface (UI) for receiving a call accepting command on display (or a UI for notifying a user that a call is received at the second electronic device 200).

However, when the URI or the IMPU included in the Referred-By header of the INVITE message is different than the IMPU or the GRUU included in the SIP 'MESSAGE' message (or the IMPU of the second electronic device 200) in step 420, the second electronic device 200 displays a UI for receiving a call accepting command on a display (or a UI of notifying a user that a call is received at the second electronic device 200) in step 440. For example, the second electronic device 200 may determine that a new call is received, not that an existing call from an electronic device using the same IMPU is received.

Figure 5:
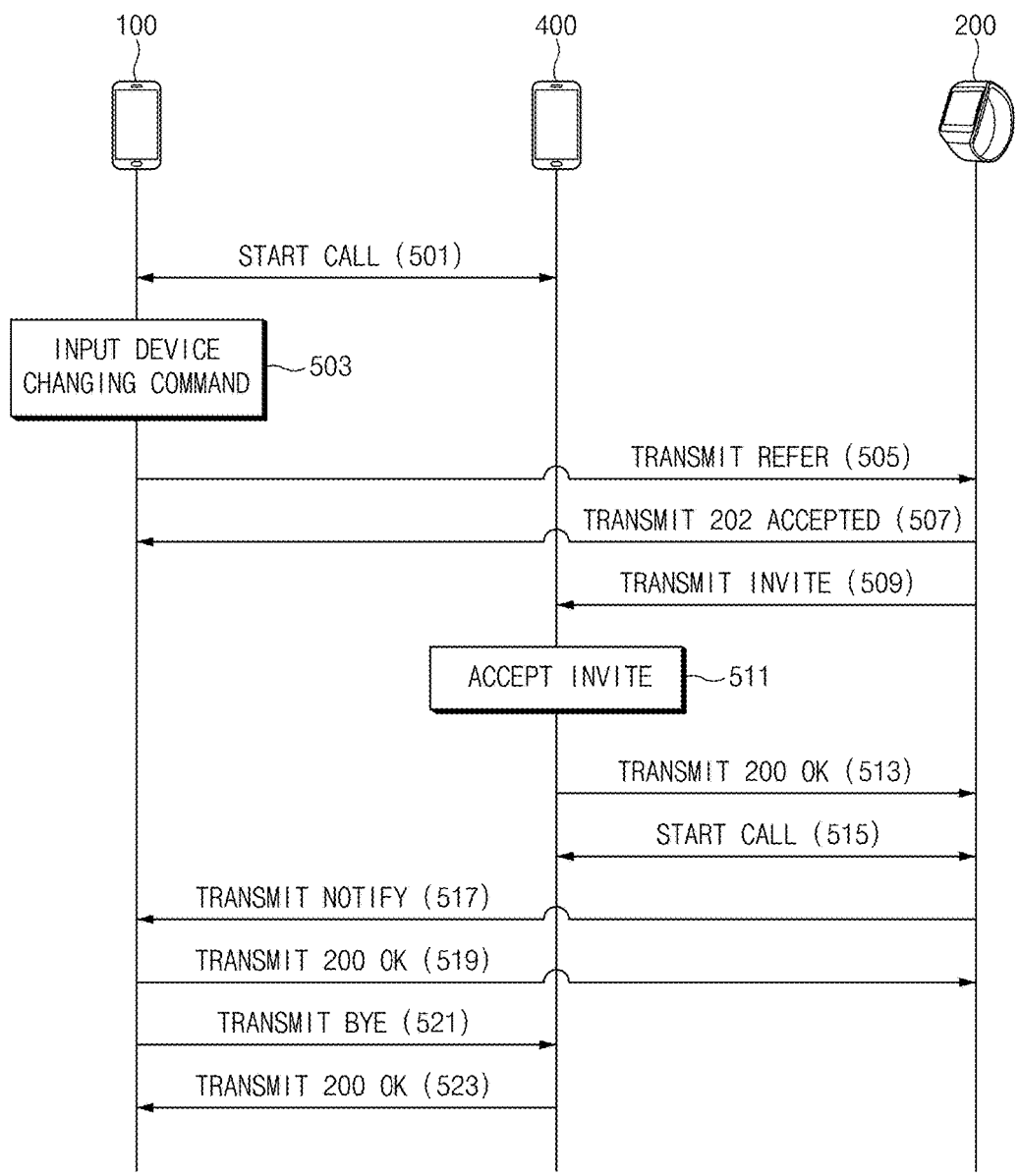
FIG. 5 is a signal flow diagram illustrating a procedure of changing a device during a call, according to an embodiment of the present disclosure.

FIG. 5 is a signal flow diagram illustrating a procedure of changing a device during a call, according to an embodiment of the present disclosure. Specifically, FIG. 5 illustrates that a phone device being changed (or a call transfer) when the fourth electronic device 400 does not support a REFER request from the first electronic device 100.

Referring to FIG. 5, in step 501, a call is established between the first and fourth electronic devices 100 and 400.

During the call, in step 503, a device changing command (or call transfer command) is input by a user to the first electronic device 100. For example, a user of the first electronic device 100 may input a user command for changing the device making the call, from the first electronic device 100 to the second electronic device 200.

In step 505, the first electronic device 100 transmits a REFER request to the second electronic device 200. Identification information or call leg info, e.g., a call-ID, a "from" tag, and a "to" tag, of the call to the fourth electronic device 400 may be included in a Replaces header included in the REFER message.

The REFER message may also include call state information of the call. For example, the call state information may include at least one of a talk time, information of a called party (e.g., a name or an image stored in a contact list of a user of the fourth electronic device 400), and an initial call connection direction (e.g., caller and receiver about a call).

In step 507, the second electronic device 200 transmits a 202 ACCEPTED response to the first electronic device 100.

In step 509, the second electronic device 200 designates the GRUU included in the Refer-To header of the REFER message as URI and transmits an INVITE message to the fourth electronic device 400. For example, the second electronic device 200 may compare subscription information (e.g., IMPU) of an electronic device (i.e., the first electronic device 100) transmitting the REFER message with subscription information of the second electronic device 200. If subscription information of the first electronic device 100 is the same as subscription information of the second electronic device 200, the second electronic device 200 may accept the REFER request, without specific confirmation of a user, and may transmit the INVITE message to the fourth electronic device 400. The INVITE message may include the Replaces header of the REFER message.

In step 511, the fourth electronic device 400 accepts the INVITE message (or a call). For example, if call identification information included in the Replaces header of the INVITE message is the same as call identification information of the call between the first electronic device 100 and the fourth electronic device 400, the fourth electronic device 400 may accept the INVITE message.

In step 513, the fourth electronic device 400 transmits a 200 OK response to the second electronic device 200.

In step 515, the call is established between the second and fourth electronic devices 200 and 400.

The second electronic device 200 may provide a UI indicating a call state using the call state information included in the REFER message. That is, even though an electronic device making the call changes from the first electronic device 100 to the second electronic device 200, a UI originally displayed on the first electronic device 100 may be then be displayed on the second electronic device 200.

In step 517, the second electronic device 200 transmits, to the first electronic device 100, a NOTIFY message indicating that the change of a phone device (or call transfer) is successfully performed.

In step 519, the first electronic device 100 transmits a 200 OK response to the second electronic device 200.

In step 521, the first electronic device 100 transmits a BYE message to the fourth electronic device 400, and in step 523, the fourth electronic device 400 transmits a 200 OK response to the first electronic device 100. Accordingly, the call between the first and fourth electronic devices 100 and 400 may be ended.

Although FIG. 5 illustrates that the second electronic device 200 transmits the NOTIFY message, after the 200 OK response is received from the fourth electronic device 400, alternatively, the second electronic device 200 may transmit the NOTIFY message after step 507 is performed. The earlier the second electronic device 200 transmits the NOTIFY message, the earlier the call between the first and fourth electronic devices 100 and 400 may be ended.

Although the IMS server 500 is not illustrated in FIG. 5, the messages transmitted and received between the first electronic device 100, the second electronic device 200, and the fourth electronic device 400 (e.g., a REFER message, an INVITE message, a NOTIFY message, a 200 OK message, a 202 ACCEPTED message, etc.) may be transmitted and received through the IMS server 500.

Figure 6:
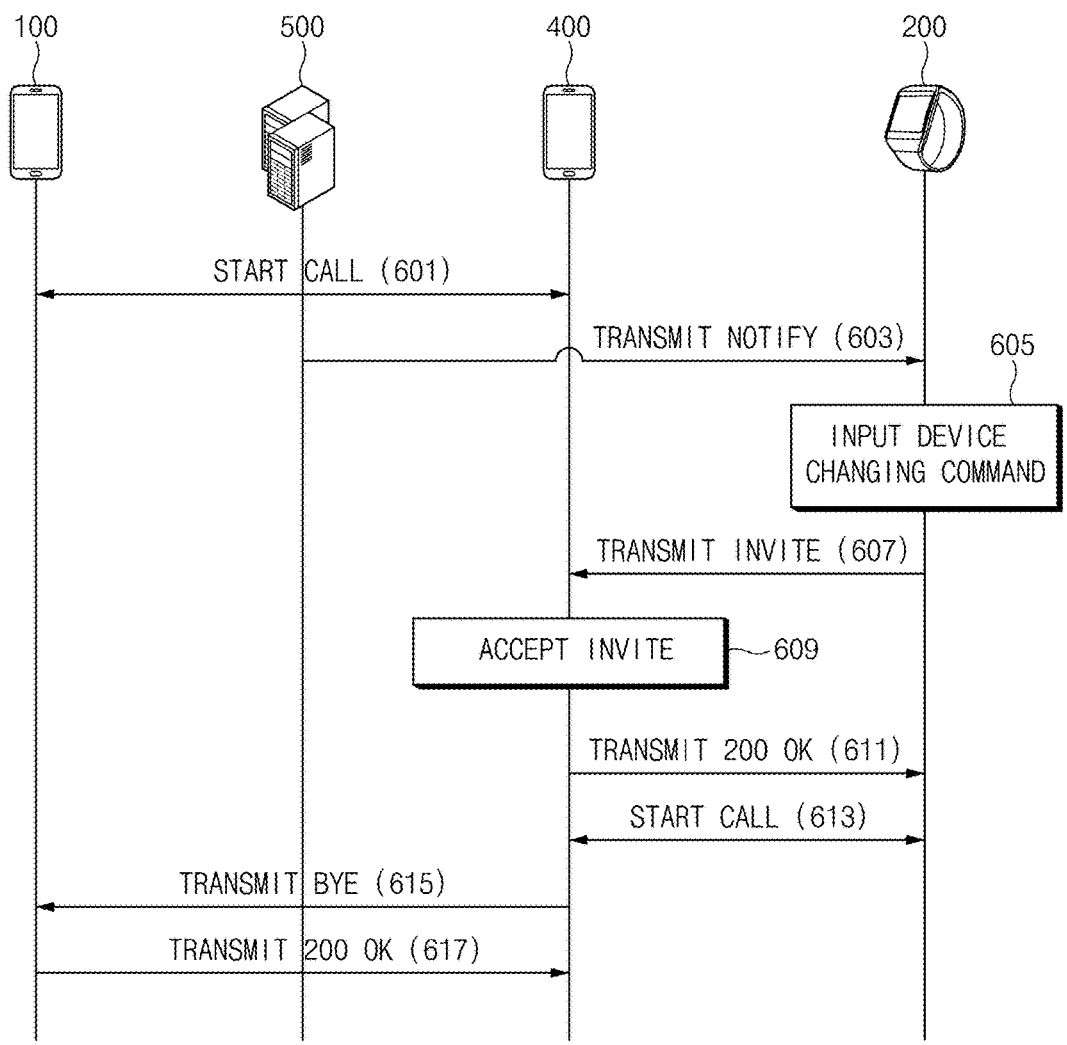
FIG. 6 is a signal flow diagram illustrating a procedure of changing a device during a call, according to an embodiment of the present disclosure.

FIG. 6 is a signal flow diagram illustrating a procedure for changing a device during a call, according to an embodiment of the present disclosure. Specifically, FIG. 6 illustrates the first electronic device 100 changing a phone device (or transferring a call) to the second electronic device 200, for a current call, based on a user command input in the second electronic device 200, which uses the same subscription information as the first electronic device 100.

Referring to FIG. 6, in step 601, a call is established between the first and fourth electronic devices 100 and 400.

In step 603, the IMS server 500 transmits a NOTIFY message including dialog event information to the second electronic device 200. Accordingly, when the call state between the first and fourth electronic devices 100 and 400 changes, the IMS server 500 may transmit the NOTIFY message including the dialog event information to a device (e.g., the second electronic device 200) registered in the IMS network with the same subscription information as the first electronic device 100. For example, the dialog event information may include call identification information (e.g., call-ID, from tag, and to tag) and a call state (e.g., the starting of a call or the ending of a call).

The NOTIFY message may include the call state information of a current call.

Alternatively, the IMS server 500 may periodically (or by a specific time interval) transmit the NOTIFY message including the dialog event information to the second electronic device 200, regardless of the change of the dialog event.

In step 605, a device changing command (or call transfer command) is input to the second electronic device 200. For example, the second electronic device 200 may receive a user command for changing the device that makes the current call from the first electronic device 100 to the second electronic device 200.

In step 607, the second electronic device 200 transmits an INVITE message to the fourth electronic device 400. Identification information (e.g., call-ID, from tag, and to tag) of the call between the first and fourth electronic devices 100 and 400 may be included in a Replaces header included in the INVITE message.

If the device changing command is input, the second electronic device 200 may perform a user authentication. For example, if the device changing command is input, the second electronic device 200 may require an authentication procedure, such as a PIN input, a voice recognition, a fingerprint recognition, etc., and may transmit the INVITE message to the fourth electronic device 400, after the authentication procedure is completed.

In step 609, the fourth electronic device 400 accepts the INVITE message (or a call). For example, if call identification information included in the Replaces header of the INVITE message is the same as call identification information of the call to the first electronic device 100, the fourth electronic device 400 may accept the INVITE message.

In step 611, the fourth electronic device 400 transmits a 200 OK response to the second electronic device 200.

In step 613, a call is established between the second and fourth electronic devices 200 and 400. For example, if a call to the second electronic device 200 starts, the fourth electronic device 400 may transmit voice or video data, which was transmitted to the first electronic device 100, to the second electronic device 200.

The second electronic device 200 may provide a UI indicating a call state using the call state information included in the NOTIFY message. That is, even though an electronic device that makes the call is changed from the first electronic device 100 to the second electronic device 200, a UI originally displayed on the first electronic device 100 may then be displayed on the second electronic device 200.

In step 615, the fourth electronic device 400 transmits a BYE message to the first electronic device 100, and in step 617, the first electronic device 100 transmits a 200 OK response to the fourth electronic device 400. Accordingly, a call between the first and fourth electronic devices 100 and 400 may be ended.

Alternatively, the operations performed by the fourth electronic device 400 in FIG. 6 may be performed instead by a B2BUA that performs proxy with respect to a signal of another device in an IMS network. For example, when the fourth electronic device 400 does not support a SIP message for supporting the change of a phone device (or call transfer), the B2BUA AS may perform above-described operations in place of the fourth electronic device 400. As such, in step 609, when the second electronic device 200 is registered with the same subscriber information as the first electronic device 100, the second electronic device 200 may only perform an additional authentication procedure so as to accept an INVITE message. The B2BUA may be a user agent and may simultaneously perform functions of a UAS and a UAC. The B2BUA may be similar to a SIP proxy server to transmit a message between the UAS and the UAC. However, the B2BUA may differ from the SIP proxy server in that the B2BUA generates and transmits a new SIP dialog based on the received SIP message.

Although not illustrated in FIG. 6, the messages transmitted and received between the first electronic device 100, the second electronic device 200, and the fourth electronic device 400 may be transmitted and received through the IMS server 500.

Figure 7:
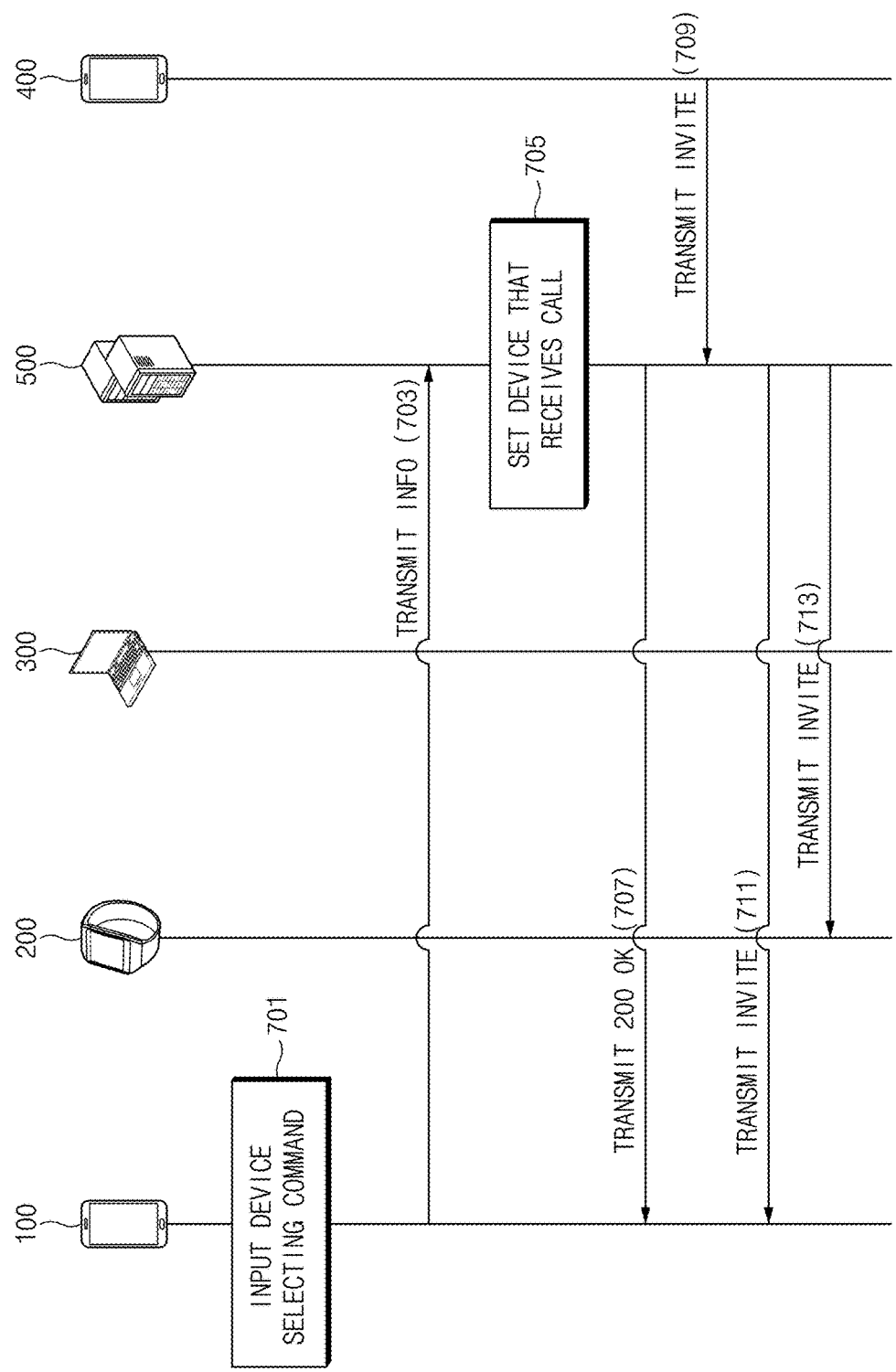
FIG. 7 is a signal flow diagram illustrating a procedure of limiting reception of a call of a specific electronic device, according to an embodiment of the present disclosure.

FIG. 7 is a signal flow diagram illustrating a procedure for limiting reception of a call of a specific electronic device, according to an embodiment of the present disclosure. Specifically, FIG. 7 illustrates a procedure limiting the reception of a call of the third electronic device 300, based on a user command, when the first electronic device 100, the second electronic device 200, and the third electronic device 300 are registered in an IMS network state with the same subscription information.

Referring to FIG. 7, in step 701, the first electronic device 100 receives a user command for selecting a device to receive a call, from among the electronic devices registered in the IMS network with the same subscription information. For example, when a user is outside of his home, while the third electronic device 300 (e.g., a laptop) is at home, the user may select the first electronic device 100 and the second electronic device 200 to receive calls. That is, the user excludes the third electronic device 300 from receiving calls.

If an electronic device is registered in the IMS network, the electronic device may receive a NOTIFY message including 'reginfo' from the IMS server 500. As described above with reference to FIG. 3, the 'reginfo' may include information about other devices that use the same subscription information. The first electronic device 100 may provide a UI for receiving a device selecting command using 'reginfo'.

In step 703, the first electronic device 100 transmits, to the IMS server 500, an INFO message for limiting the reception of the third electronic device 300. The INFO message may include a device identifier (e.g., GRUU) of the third electronic device 300. Alternatively, the first electronic device 100 may limit the reception of the third electronic device 300 using other SIP messages, such as a 'MESSAGE' message.

In step 705, the IMS server 500 sets a device for receiving a call. For example, the IMS server 500 may set the third electronic device 300 as a device not permitted for call reception, e.g., using the device identifier (e.g., GRUU) of the third electronic device 300 included in the INFO message.

In step 707, the IMS server 500 transmits a 200 OK message to the first electronic device 100.

In step 709, the fourth electronic device 400 transmits an INVITE message to the IMS server 500. The INVITE message may include an IMPU used by each of the first to third electronic devices 100 to 300.

In steps 711 and 713, the IMS server 500 transmits the INVITE message to the first electronic device 100 and the second electronic device 200, respectively, but not to the third electronic device 300, using the IMPU included in the INVITE message.

Although FIG. 7 illustrates that a user command for selecting an electronic device is input through the first electronic device 100, the user command may also be input through another electronic device (e.g., the second electronic device 200 or the third electronic device 300) registered in the IMS network with the same subscription information.

Figure 8:
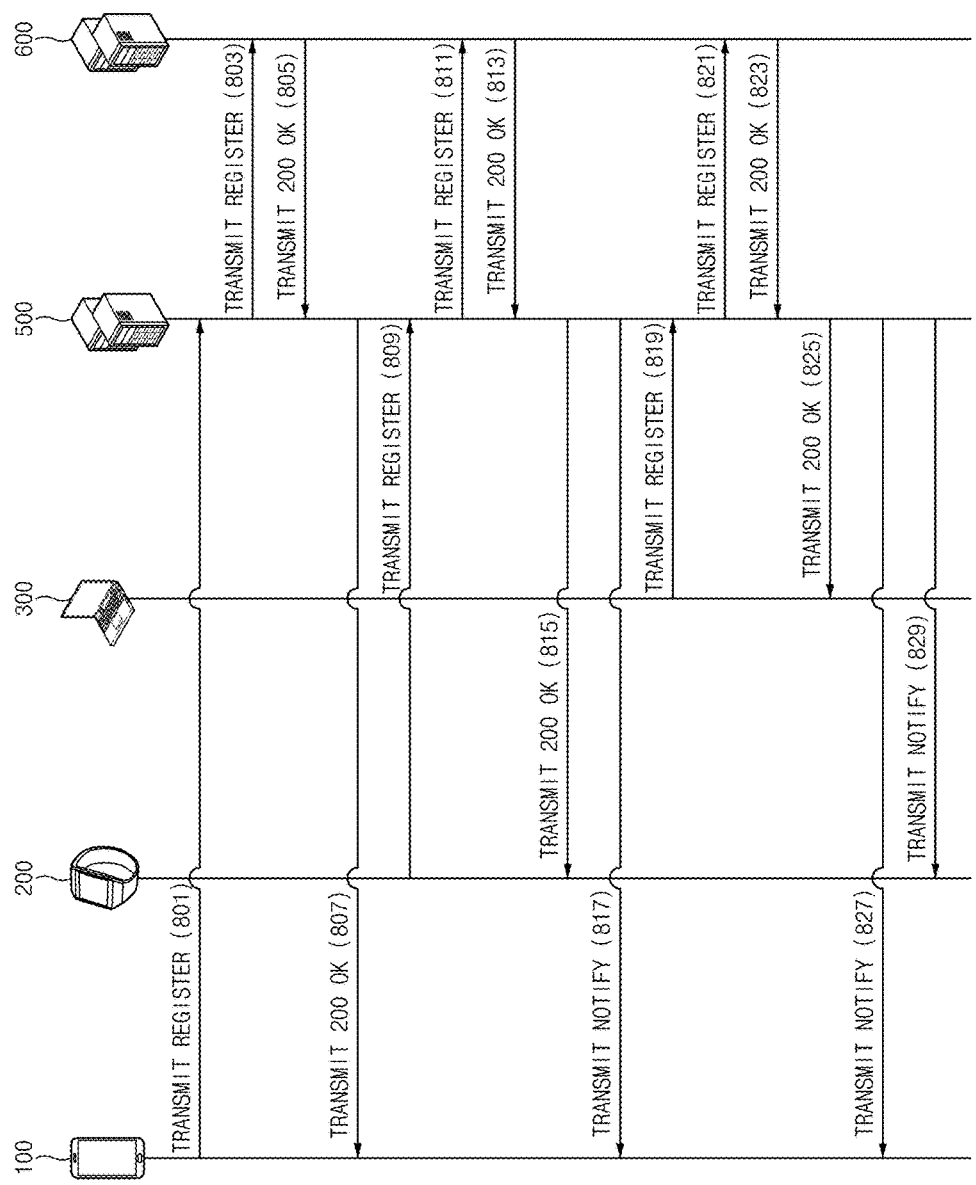
FIG. 8 is a signal flow diagram illustrating a procedure of registering an IMS server of an electronic device according to an embodiment of the present disclosure.

FIG. 8 is a signal flow diagram illustrating a procedure of registering in an IMS server, by an electronic device, according to an embodiment of the present disclosure. Specifically, FIG. 8 illustrates a procedure in which the first to third electronic devices 100 to 300 are registered with the same subscription information (e.g., IMPU) in an IMS network.

Referring to FIG. 8, in step 801, the first electronic device 100 transmits a REGISTER request to the IMS server 500. The REGISTER request may include position information of the first electronic device 100. For example, the position information may include GNSS information (e.g., longitude and latitude) or a serving cell ID corresponding to the current position of the first electronic device 100.

In step 803, the IMS server 500 registers the first electronic device 100 in an IMS network and transmits the REGISTER request to the location server 600.

In step 805, the location server 600 stores the position information of the first electronic device 100 included in the REGISTER request and transmits a 200 OK response to the IMS server 500.

In step 807, the IMS server 500 transmits a 200 OK response to the first electronic device 100.

Similarly, in step 809, the second electronic device 200 transmits a REGISTER request to the IMS server 500. The REGISTER message may include the position information of the second electronic device 200.

In step 811, the IMS server 500 registers the second electronic device 200 in the IMS network and transmits the REGISTER request to the location server 600.

In step 813, the location server 600 stores the position information of the second electronic device 200 included in the REGISTER request and transmits a 200 OK response to the IMS server 500.

In step 815, the IMS server 500 transmits a 200 OK response to the second electronic device 200.

In step 817, the IMS server 500 transmits a NOTIFY message to the first electronic device 100. The IMS server 500 may transmit the NOTIFY message, in which 'reginfo' is stored, to all of the devices (e.g., the first electronic device 100) having the same subscription information registered in the IMS network. Accordingly, the first electronic device 100 may recognize that the second electronic device 200 that uses the same subscription information is also registered in the IMS network.

In steps 819 to 825, the third electronic device 300 registers in the IMS network. Steps 819 to 825 include the same operations as steps 801 to 807 and 809 to 815, as described above.

In steps 827 and 829, the IMS server 500 transmits a NOTIFY message to the first and second electronic devices 100 and 200, respectively. Accordingly, the first and second electronic devices 100 and 200 may recognize that the third electronic device 300 that uses the same subscription information is also registered in the IMS network.

As illustrated in FIG. 8, when a REGISTER request is requested from an electronic device, the IMS server 500 may transmit a REGISTER request to the location server 600. Accordingly, the position information of an electronic device included in the location server 600 may be continuously updated.

Figure 9:
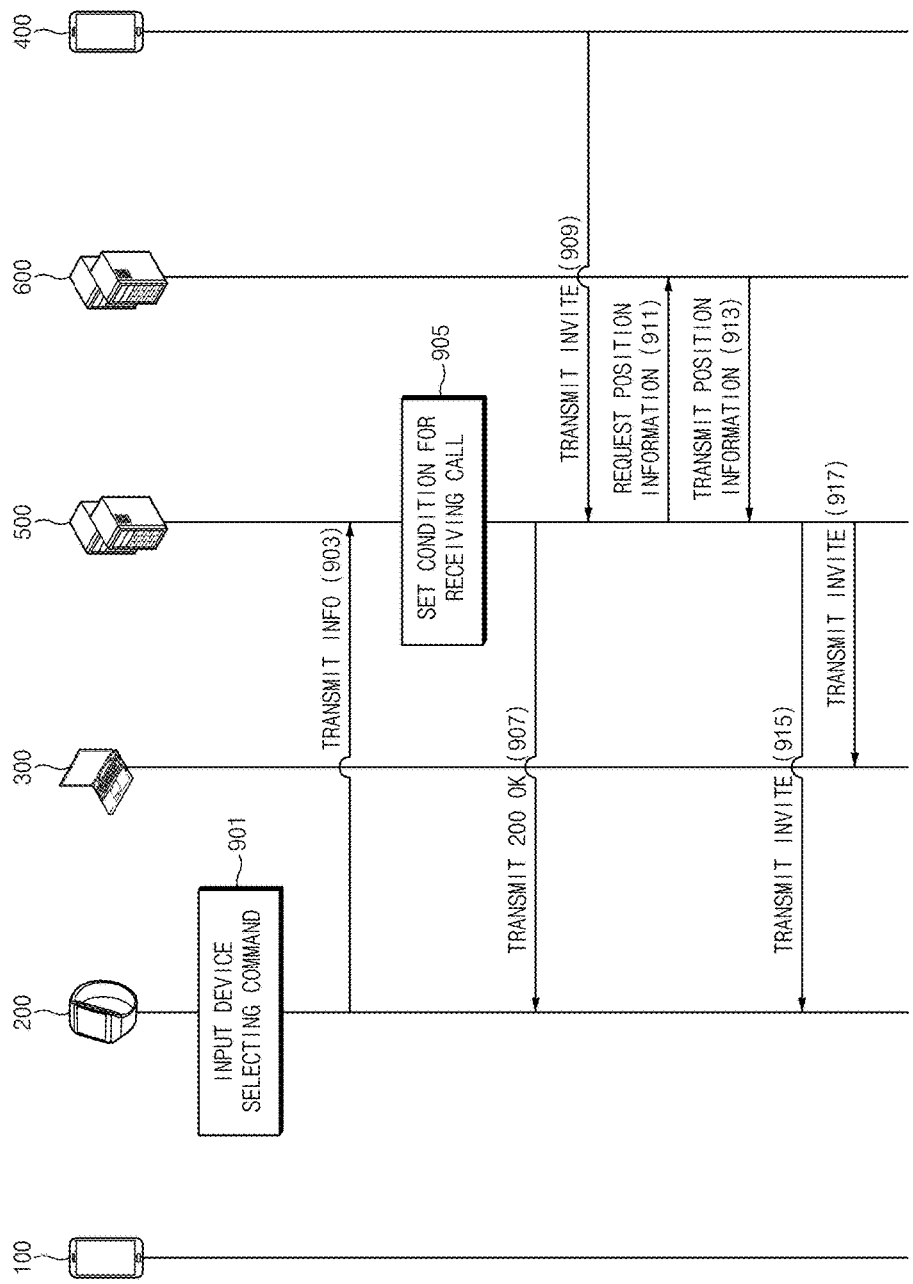
FIG. 9 is a signal flow diagram illustrating a procedure of limiting reception of a call of a specific electronic device, according to an embodiment of the present disclosure.

FIG. 9 is a signal flow diagram illustrating a procedure for limiting reception of a call of a specific electronic device, according to an embodiment of the present disclosure. Specifically, FIG. 9 illustrates a procedure for limiting reception of a call of the first electronic device 100, based on a user command and based on position information of the electronic device, when the first to third electronic devices 100 to 300 are registered with the same subscription information in an IMS network.

Referring to FIG. 9, in step 901, the second electronic device 200 receives a user command for selecting at least one of the electronic devices registered with the same subscription information in the IMS network. For example, if a user selects the second electronic device 200, an electronic device that is located within a specific distance from the second electronic device 200 may accept the reception of a call, and the reception of a call of an electronic device that is located outside a specific distance may be prevented.

If an electronic device is registered in the IMS network, the electronic device may receive, from the IMS server 500, a NOTIFY message including 'reginfo' that includes information about other devices that use the same subscription information.

The second electronic device 200 may provide a UI for receiving a device selecting command using the 'reginfo'.

In step 903, the second electronic device 200 transmits, to the IMS server 500, an INFO message for setting the second electronic device 200, such that only electronic devices located around the second electronic device 200 may receive a call. The INFO message may include the device identifier (e.g., GRUU) of the second electronic device 200. The second electronic device 200 may also set an electronic device that will receive a call using another SIP message, such as a 'MESSAGE' message.

In step 905, the IMS server 500 sets a condition for selecting a device that will receive a call. For example, the IMS server 500 may set a condition for receiving a call, such that a device that is located within a designated distance from the second electronic device 200 receives a call.

In step 907, the IMS server 500 transmits a 200 OK message to the second electronic device 200.

In step 909, the fourth electronic device 400 transmits an INVITE message to the IMS server 500. The INVITE message may include an IMPU that is used by each of the first to third electronic devices 100 to 300.

In step 911, the IMS server 500 requests position information of the first to third electronic devices 100 to 300 using an IMPU included in the INVITE message from the location server 600.

In step 913, the location server 600 transmits the requested position information to the IMS server 500. The position information may include whether each electronic device is located in a specific area or a constant area, whether specific terminals are in the same area, etc., as well as a physical position of each electronic device.

In steps 915 and 917, based on the position information, the IMS server 500 transmits an INVITE message to at least one of the first to third electronic devices 100 to 300, using IMPU included in the INVITE message. For example, when the third electronic device 300 is located around the second electronic device 200 and the first electronic device 100 is away from the second electronic device 200, the IMS server 500 transmits an INVITE message to the second and third electronic devices 200 and 300, but not to the first electronic device 100.

Figure 10:
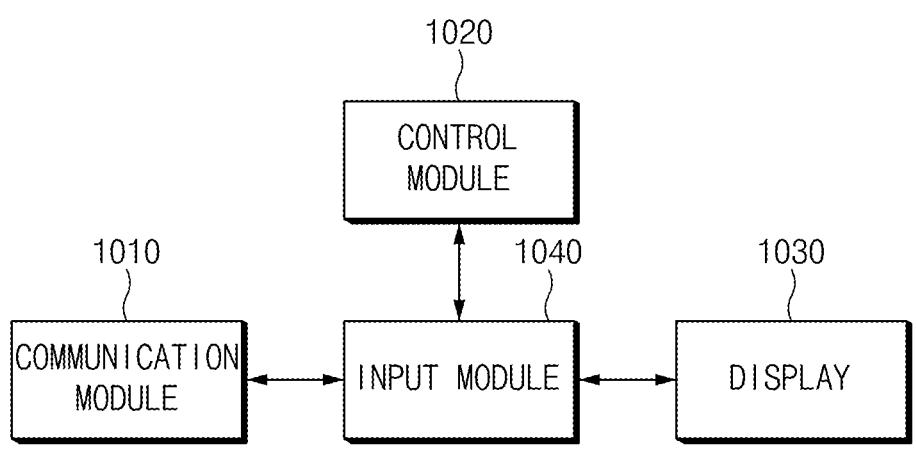
FIG. 10 illustrates an electronic device according to an embodiment of the present disclosure.

FIG. 10 illustrates an electronic device according to an embodiment of the present disclosure. For example, the electronic device illustrated in FIG. 10 may correspond to the first electronic device 100, the second electronic device 200, or the third electronic device 300, as described above with reference to FIGS. 1 to 9.

Referring to FIG. 10, the electronic device includes a communication module 1010, an input module 1020, a display 1030, and a control module 1040.

The communication module 1010 may communicate with the IMS server 500 through an IMS network. The communication module 1010 may exchange communication data (e.g., voice or video data) with the IMS server 500. The communication module 1010 may exchange an SIP message with the IMS server 500. As described above, the SIP message may include a REFER message, a MESSAGE message, an INVITE message, a NOTIFY message, a SUBSCRIBE message, an INFO message, a BYE message, a 200 OK message, a 202 ACCEPTED message, etc.

The input module 1020 may receive a user command. The input module 1020 may receive a phone device changing command (or call transfer command) or a user command for selecting a device receiving a call.

The input module 1020 may include a touch sensor panel for sensing a touch manipulation of a user or a pen sensor panel (e.g., digitizer) for sensing a pen manipulation of a user. The input module 1020 may include a motion recognition sensor for recognizing the motion of a user or a voice recognition sensor for recognizing the voice of a user. The input module 1020 may include an input device such as a keyboard, a mouse, a keypad, etc.

The display 1030 may display a UI indicating a call state, a UI for receiving a call transfer command, a UI for selecting a device receiving a call, and/or a UI for receiving a call accepting command.

The control module 1040 may control overall operations of the electronic device. For example, the control module 1040 may control a call processing operation of an electronic device, e.g., according to procedures described above with reference to FIGS. 1-9, by controlling each of the communication module 1010, the input module 1020, and the display 1030. The control module 1040 may include at least one processor for controlling the call processing operation.

If an INVITE message is received from the IMS server 500, the control module 1040 may compare subscription information (e.g., IMPU) of the INVITE message included in a referred-by header with subscription information of the electronic device. If the subscription information of the INVITE message included in a referred-by header is the same as the subscription information of the electronic device, the control module 1040 may control the electronic device, which makes a call, to an external electronic device (e.g., the fourth electronic device 400) requesting the transmission of the INVITE message. For example, if the subscription information of the INVITE message included in a referred-by header is the same as the subscription information of the electronic device, the control module 1040 may control the electronic device to transmit a 200 OK response about the INVITE message to an electronic device requesting the transmission of the INVITE message through the IMS server 500.

If the subscription information of the INVITE message included in a referred-by header is not the same as the subscription information of the electronic device, the control module 1040 may control the electronic device to display a UI for receiving a call accepting command on a display.

If the call accepting command is input from a user, the control module 1040 may control the electronic device to transfer the call to an external electronic device requesting the transmission of the INVITE message.

If a REFER message is received from the IMS server 500, the control module 1040 may compare subscription information (e.g., IMPU) of the REFER message included in the referred-by header with subscription information of the electronic device. If the subscription information of the REFER message included in the referred-by header is the same as the subscription information of the electronic device, the control module 1040 may control the electronic device to transmit the INVITE message as subscription information included in the refer-to header of the REFER message through the IMS server 500.

If a 'MESSAGE' message is received from the IMS server 500 and indicates that a call transfer of a current call of an external electronic device (e.g., the first electronic device 100) that uses the same subscription information as that of the electronic device is scheduled, the control module 1040 may compare IMPU or the GRUU included in the 'MESSAGE' message with IMPU or the GRUU included in a referred-by header of the INVITE message. If the IMPU or the GRUU included in the 'MESSAGE' message is the same as the IMPU or the GRUU included in the referred-by header of the INVITE message, the control module 1040 may control the electronic device to transfer the call to an external electronic device (e.g., the fourth electronic device 400) requesting the transmission of an INVITE message.

If a call is made to an external electronic device requesting the transmission of an INVITE message, the control module 1040 may control the electronic device to display a UI indicating a call state with the external electronic device on the display 1030. The control module 1040 may control the electronic device to display a UI using call state information included in a 'MESSAGE' message. For example, the call state information may include at least one of a talk time (e.g., a point in time of starting a call or an elapsed time), information of a called party (e.g., a name or an image of a user of the fourth electronic device 400), and an initial call connection direction (e.g., caller and receiver about a call). Accordingly, a UI displayed on an external electronic device (e.g., the first electronic device 100) that uses the same subscription information as that of the electronic device may be successively displayed on the electronic device. For example, a talk time when the first electronic device 100 made a call may be applied to a talk time when the electronic device makes the call. Further, using the call state information, even though the name of a user of the fourth electronic device 400 is not stored in the electronic device, the electronic device may display the name of the user of the fourth electronic device 400.

If a NOTIFY message including 'reginfo' of an external electronic device that uses the same subscription information as the electronic device is received from the IMS server 500, the control module 1040 may control the electronic device to display, on the display 1030, a UI for receiving a call transfer command using the name of a device included in 'reginfo'.

If a NOTIFY message including 'reginfo' of an external electronic device that uses the same subscription information as the electronic device is received from the IMS server 500, the control module 1040 may control the electronic device to display, on the display 1030, a UI for selecting a device receiving a call using the name of a device included in 'reginfo'.

FIGS. 11A to 11C are diagrams illustrating a UI displayed on an electronic device according to an embodiment of the present disclosure.

Referring to FIG. 11A, the display 1030 displays a UI including a menu associated with a device receiving a call. The device receiving the call may be selected for a device, may be individually selected, or may be determined based on the position of a specific device. In FIG. 11A, if a user selects a menu 11 of "Device", a UI illustrated in FIG. 11B may be displayed on the display 1030.

Referring to FIG. 11B, the UI displays the name (e.g., "Galaxy S", "Gear S", and "Laptop") of a device registered in an IMS network that uses the same subscription information and an object 15 for setting whether to receive a call with respect to each device. A user may set whether to receive a call with respect to each device using the object 15. For example, when a user sets "Galaxy S" to 'On', "Gear S" to 'ON', and "Laptop" to 'OFF', a call may be received in "Galaxy S" and "Gear S", but not in the "Laptop".

Referring again to FIG. 11A, if a user selects menu 13 of "Position", a UI illustrated in FIG. 11C may be displayed on the display 1030.

Referring to FIG. 11C, the UI includes the name (e.g., "Galaxy S", "Gear S", and "Laptop") of a device registered in an IMS network that uses the same subscription information and an object 17 for selecting an electronic device that becomes a reference for position determination. A user may select at least one of a plurality of devices using the object 17. For example, if a user selects "Gear S", a call may only be received by an electronic device that is located within a designated distance of Gear S.

The UI also includes an object 18 for setting a designated distance (e.g., a geo-fence radius). A user may set a designated distance using the object 18.

The UI also includes an object 19 indicating the position and a designated distance of selected device. For example, in the object 19, the position of at least one device that uses the same subscription information may be indicated on a map based on the selected device and an area included in a designated distance from the selected device may be indicated.

Figure 12A:
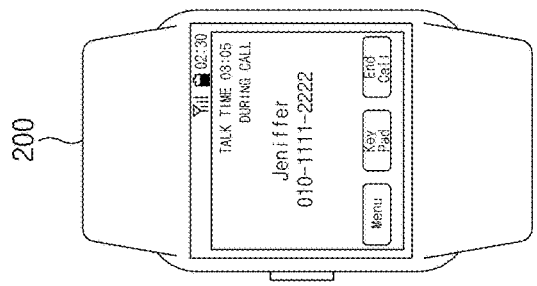
FIGS. 12A to 12C are diagrams illustrating a user interface displayed on an electronic device according to an embodiment of the present disclosure.
Figure 12B:
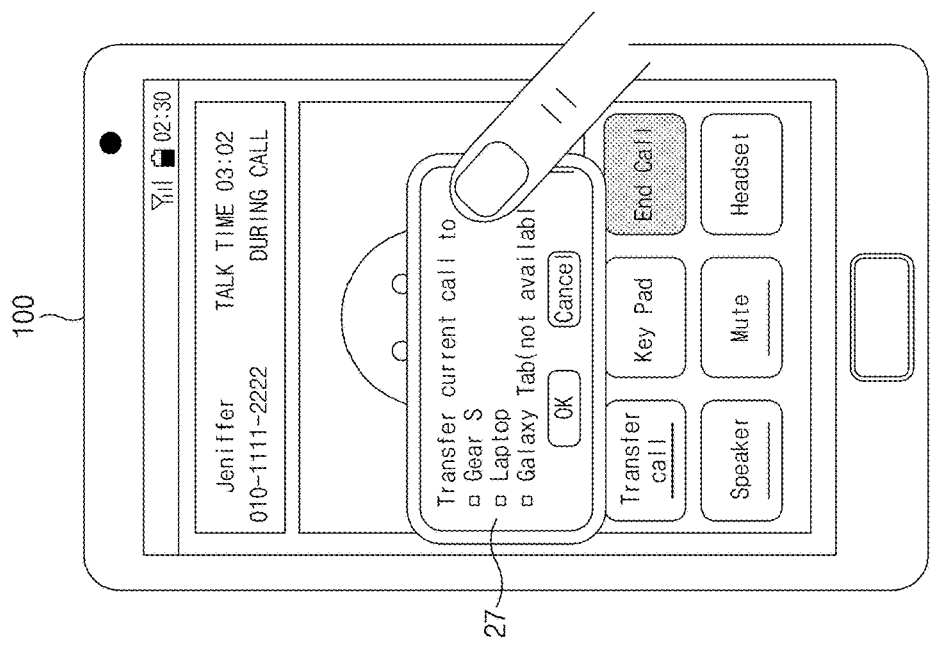
Figure 12C:
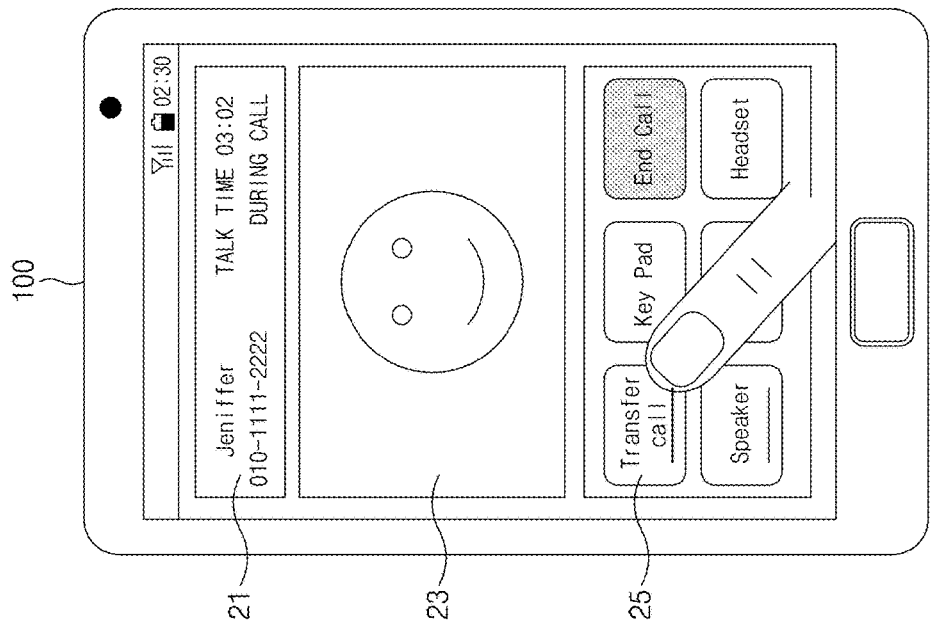

FIGS. 12A to 12C are diagrams illustrating a UI displayed on an electronic device according to an embodiment of the present disclosure. Specifically, FIGS. 12A and 12B illustrate UIs displayed on the first electronic device 100 during a call between the first electronic device 100 and an external electronic device (e.g., the fourth electronic device 400), and FIG. 12C illustrates a UI displayed on the second electronic device 200, after the call between the first electronic device 100 and the fourth electronic device 400 is transferred to the second electronic device 200, i.e., changed to a call between the second electronic device 200 and the fourth electronic device 400.

Referring to FIG. 12A, the first electronic device 100 displays a UI including an object 21 indicating a call state during a call, an image 23 of a called party (e.g., a user of the fourth electronic device 400), and a menu icon 25 for receiving a call transfer command. The object 21 indicating a call state may include the name of a called party, a telephone, and information about a talk time. A user of the first electronic device 100 may input a device changing command or a call transfer command using the menu icon 25.

For example, if a user selects the menu icon 25, as illustrated in FIG. 12B, an object 27 for selecting an electronic device to transfer a current call that the first electronic device 100 makes may be displayed. The object 27 may include a list of an electronic device that uses the same subscription information as that of the first electronic device 100. A user may select one of electronic devices included in the object 27.

For example, if a user selects "Gear S", a call may be transferred to the second electronic device 200. A call that the first electronic device 100 makes may be transferred to the second electronic device 200 based on a device changing command or a call transfer command input in the first electronic device 100.

If a call currently made by the first electronic device 100 is transferred to the second electronic device 200, the second electronic device 200 may successively display a call state displayed on the first electronic device 100 using call state information included in a 'MESSAGE' message, an INVITE message, or a REFER message before a call is transferred.

Referring to FIG. 12C, the second electronic device 200 may display a UI including the name of a called party (e.g., a user of the fourth electronic device 400), a telephone, and a talk time.

Figure 13:
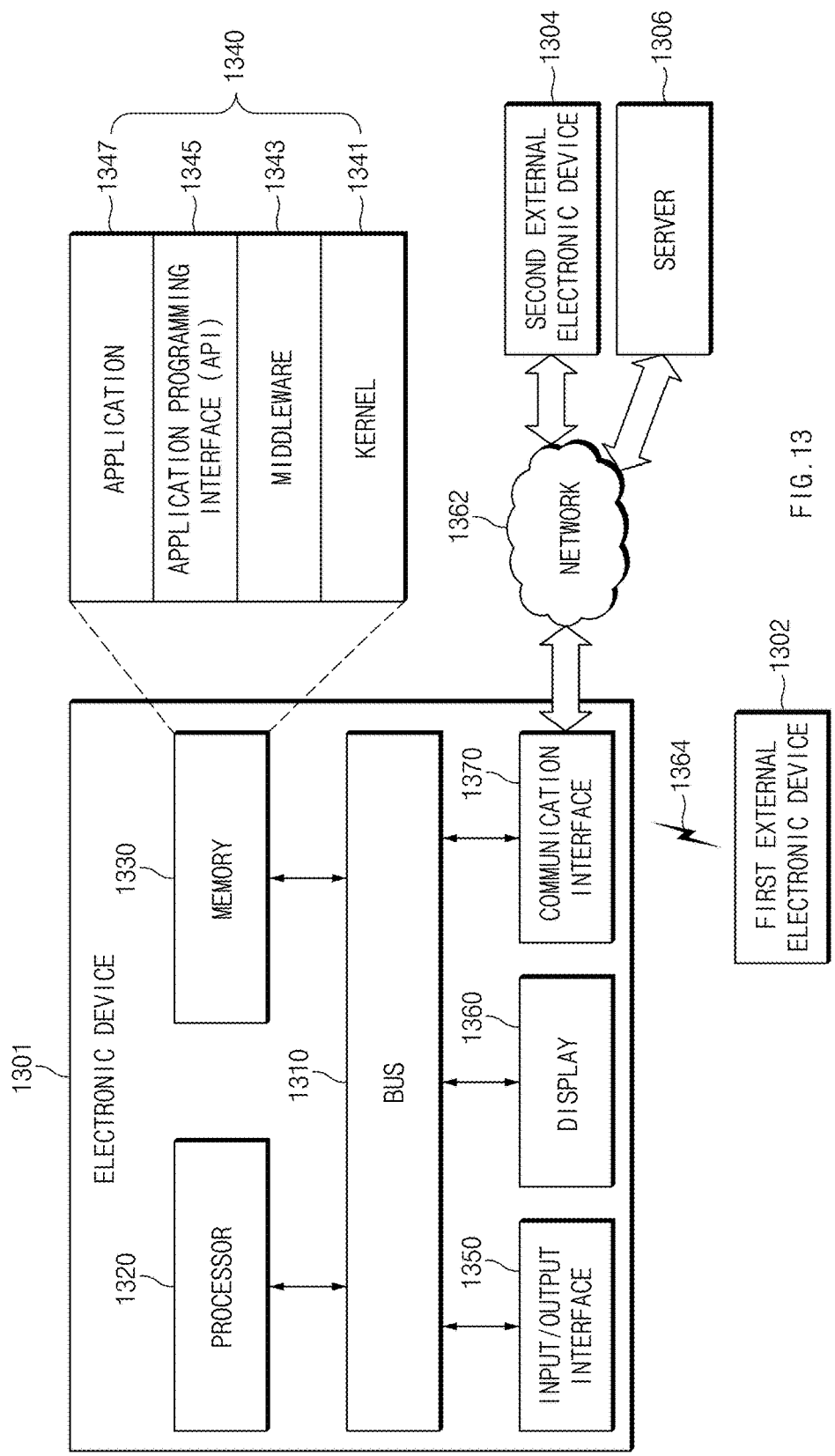
FIG. 13 illustrates an electronic device in a network environment according to an embodiment of the present disclosure.

FIG. 13 illustrates an electronic device in a network environment according to an embodiment of the present disclosure.

Referring to FIG. 13, the electronic device 1301 includes a bus 1310, a processor 1320, a memory 1330, an input/output (I/O) interface 1350, a display 1360, and a communication interface 1370. Alternatively, the electronic device 1301 may omit at least one of the above-described elements or may further include other element(s).

The bus 1310 may interconnect the above-described elements 1310 to 1370 and may include a circuit for conveying communications (e.g., a control message and/or data) among the above-described elements.

The processor 1320 may include one or more of a central processing unit (CPU), an application processor (AP), or a communication processor (CP). The processor 1320 may perform data processing or an operation associated with control or communication of at least one other element(s) of the electronic device 1301.

The memory 1330 may include a volatile and/or nonvolatile memory. For example, the memory 1330 may store instructions or data associated with at least one other element(s) of the electronic device 1301. The memory 1330 stores software and/or a program 1340.

The program 1340 includes a kernel 1341, a middleware 1343, an application programming interface (API) 1345, and an application program (or "application") 1347. At least a part of the kernel 1341, the middleware 1343, or the API 1345 may be referred to as an "operating system (OS)".

The kernel 1341 may control or manage system resources (e.g., the bus 1310, the processor 1320, the memory 1330, etc.) that are used to execute operations or functions of other programs (e.g., the middleware 1343, the API 1345, and the application program 1347). Further, the kernel 1341 may provide an interface for the middleware 1343, the API 1345, or the application program 1347 to access elements of the electronic device 1301, in order to control or manage system resources.

The middleware 1343 may perform a mediation role such that the API 1345 or the application program 1347 communicates with the kernel 1341 to exchange data. Further, the middleware 1343 may process one or more task requests received from the application program 1347 according to a priority. For example, the middleware 1343 may assign the priority, which makes it possible to use a system resource (e.g., the bus 1310, the processor 1320, the memory 1330, etc.) of the electronic device 1301, to at least one of the application program 1347 and may process the task requests.

The API 1345 may be an interface through which the application program 1347 controls a function provided by the kernel 1341 or the middleware 1343, and may include at least one interface or function (e.g., an instruction) for a file control, a window control, image processing, a character control, or the like.

The I/O interface 1350 may transmit an instruction or data, input from a user or another external device, to other element(s) of the electronic device 1301. Further, the I/O interface 1350 may output an instruction or data, received from other element(s) of the electronic device 1301, to a user or another external device.

The display 1360 may include a liquid crystal display (LCD), a light-emitting diode (LED) display, an organic LED (OLED) display, or a microelectromechanical systems (MEMS) display, or an electronic paper display. The display 1360 may display, for example, various contents (e.g., a text, an image, a video, an icon, a symbol, etc.) to a user. The display 1360 may include a touch screen that receives a touch, gesture, proximity, or hovering input using an electronic pen or a part of a user's body.

The communication interface 1370 may establish communication between the electronic device 1301 and a first external electronic device 1302, a second external electronic device 1304, or a server 1306. For example, the communication interface 1370 may be connected to a network 1362 through wireless communication or wired communication to communicate with the second external electronic device 1304 or the server 1306.

The wireless communication may include at least one of long-term evolution (LTE), LTE Advance (LTE-A), Code Division Multiple Access (CDMA), Wideband CDMA (WCDMA), Universal Mobile Telecommunications System (UMTS), Wireless Broadband (WiBro), Global System for Mobile Communications (GSM), etc., as cellular communication protocol. Further, the wireless communication may include a local area network 1364, such as a wireless fidelity (Wi-Fi), a Bluetooth, a Bluetooth low energy (BLE), a Zigbee, a near field communication (NFC), a magnetic secure transmission, or GNSS. The GNSS may include at least one of a GPS, a global navigation satellite system (Glonass), Beidou Navigation Satellite System, Galileo, the European global satellite-based navigation system, etc.

The wired communication may include at least one of a universal serial bus (USB), a high definition multimedia interface (HDMI), a recommended standard-232 (RS-232), power line communication (PLC), or a plain old telephone service (POTS). The network 1362 may include at least one of telecommunications networks, for example, a computer network (e.g., LAN or WAN), an Internet, or a telephone network.

Each of the external first and second external electronic devices 1302 and 1304 may be a device of which the type is different from or the same as that of the electronic device 1301.

The server 1306 may include a group of one or more servers (e.g., an IMS server 500 or a location server 600).

All or a part of operations that the electronic device 1301 will perform may be executed by the electronic devices 1302 and 1304 and/or the server 1306. For example, when the electronic device 1301 executes a function or service, instead of performing the function or the service internally, the electronic device 1301 may request at least a part of a function associated with the electronic device 1301 from the electronic device 1302 or 1304 and/or the server 1306. The electronic device 1302 or 1304 and/or the server 1306 may execute the requested function or additional function, and may transmit the execution result to the electronic device 1301. The electronic device 1301 may provide the requested function or service using the received result or may additionally process the received result to provide the requested function or service. To this end, for example, cloud computing, distributed computing, or client-server computing may be used.

Figure 14:
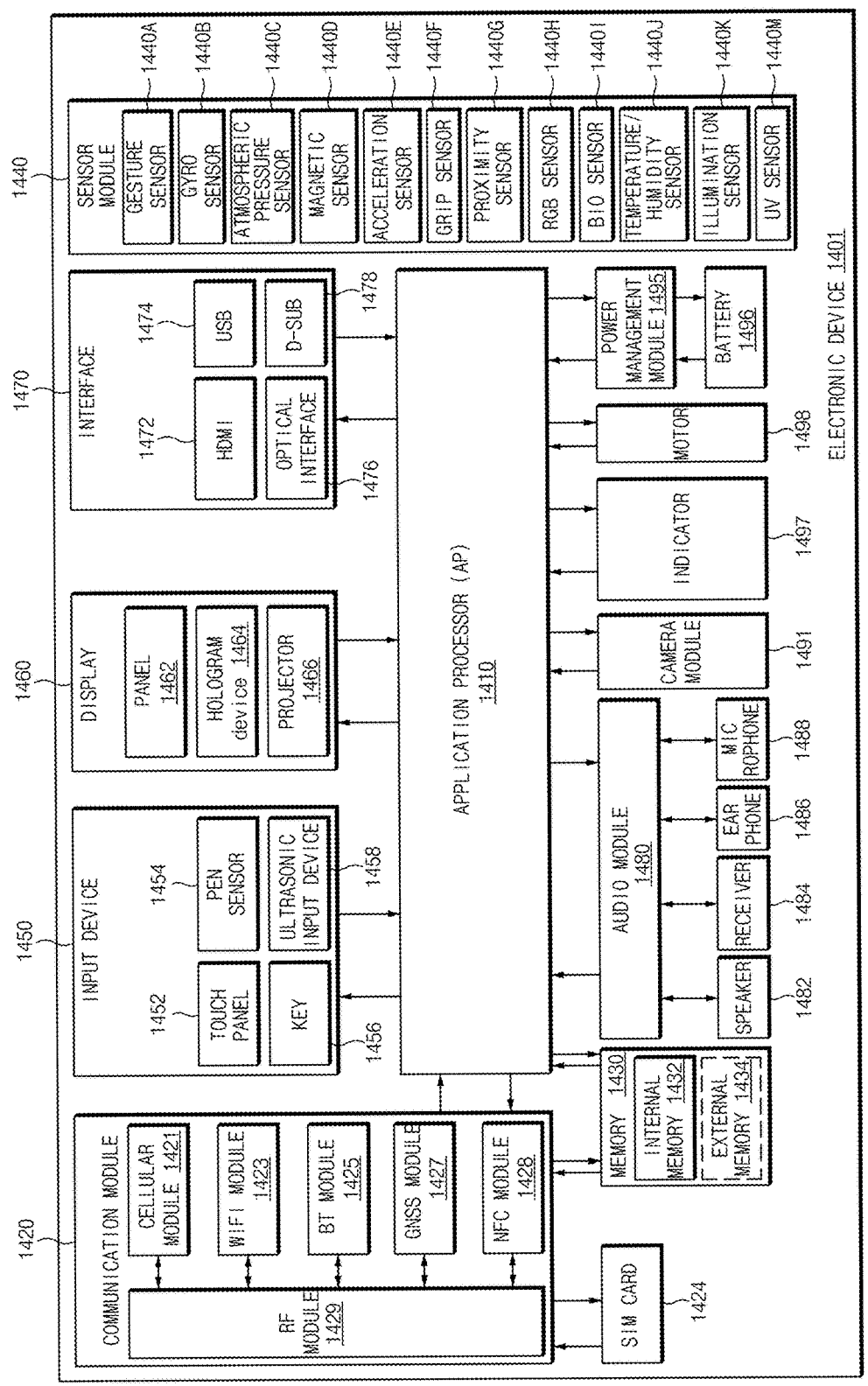
FIG. 14 illustrates an electronic device according to an embodiment of the present disclosure.

FIG. 14 illustrates an electronic device according to an embodiment of the present disclosure.

Referring to FIG. 14, the electronic device 1401 includes an application processor 1410, a communication module 1420, a subscriber identification module (SIM) card 1424, a memory 1430, a sensor module 1440, an input device 1450, a display 1460, an interface 1470, an audio module 1480, a camera module 1491, a power management module 1495, a battery 1496, an indicator 1497, and a motor 1498.

The processor 1410 may drive an OS or an application to control a plurality of hardware or software elements connected to the processor 1410 and may process and compute a variety of data. The processor 1410 may be implemented with a System on Chip (SoC), for example. The processor 1410 may further include a GPU and/or an image signal processor. The processor 1410 may also include at least some of the other elements (e.g., a cellular module 1421) illustrated in FIG. 14. The processor 1410 may load and process an instruction or data, which is received from at least one of other elements (e.g., a nonvolatile memory), to a volatile memory, and may store a variety of data at a nonvolatile memory.

The communication module 1420 may include the cellular module 1421, a Wi-Fi module 1423, a Bluetooth (BT) module 1425, a GNSS module 1427 (e.g., a GPS module, a Glonass module, a Beidou module, or a Galileo module), an NFC module 1428, and a radio frequency (RF) module 1429.

The cellular module 1421 may provide voice communication, video communication, a message service, an Internet service, etc., through a communication network. The cellular module 1421 may perform discrimination and authentication of the electronic device 1401 within a communication network using the SIM card 1424. The cellular module 1421 may perform at least a part of functions that the processor 1410 provides. The cellular module 1421 may include a communication processor (CP).

At least two of the cellular module 1421, the Wi-Fi module 1423, the BT module 1425, the GNSS module 1427, and the NFC module 1428 may be included within one Integrated Circuit (IC) or an IC package.

The RF module 1429 may transmit and receive a communication signal (e.g., an RF signal). The RF module 1429 may include a transceiver, a power amplifier module (PAM), a frequency filter, a low noise amplifier (LNA), an antenna, etc. At least one of the cellular module 1421, the Wi-Fi module 1423, the BT module 1425, the GNSS module 1427, or the NFC module 1428 may transmit and receive an RF signal through a separate RF module.

The SIM card 1424 may include unique identity information (e.g., integrated circuit card identifier (ICCID)) or subscriber information (e.g., integrated mobile subscriber identity (IMSI)).

The memory 1430 includes an internal memory 1432 and an external memory 1434. For example, the internal memory 1432 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 1434 may include a flash drive, a compact flash (CF), a secure digital (SD), a micro secure digital (Micro-SD), a mini secure digital (Mini-SD), an extreme digital (xD), a multimedia card (MMC), a memory stick, etc. The external memory 1434 may be functionally and/or physically connected with the electronic device 1401 through various interfaces.

The sensor module 1440 may measure a physical quantity or may detect an operation state of the electronic device 1401. The sensor module 1440 may convert the measured or detected information to an electrical signal.

The sensor module 1440 includes a gesture sensor 1440A, a gyro sensor 1440B, an atmospheric pressure sensor 1440C, a magnetic sensor 1440D, an acceleration sensor 1440E, a grip sensor 1440F, a proximity sensor 1440G, a color sensor 1440H (e.g., red, green, blue (RGB) sensor), a BIO sensor 1440I, a temperature/humidity sensor 1440J, an illumination sensor 1440K, and an Ultra Violet (UV) sensor 1440M.

Additionally or alternatively, the sensor module 1440 may include an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 1440 may further include a control circuit for controlling at least one or more sensors included therein.

The electronic device 1401 may further include a processor, which is a part of the processor 1410 or independent of the processor 1410, and is configured to control the sensor module 1440. The processor may control the sensor module 1440 while the processor 1310 remains at a sleep state.

The input device 1450 includes a touch panel 1452, a (digital) pen sensor 1454, a key 1456, and an ultrasonic input device 1458. The touch panel 1452 may use at least one of capacitive, resistive, infrared and ultrasonic detecting methods. The touch panel 1452 may further include a control circuit. The touch panel 1452 may further include a tactile layer to provide a tactile reaction to a user.

The (digital) pen sensor 1454 may be a part of a touch panel or may include an additional sheet for recognition.

The key 1456 may include a physical button, an optical key, a keypad, etc.

The ultrasonic input device 1458 may detect (or sense) an ultrasonic signal, which is generated from an input device, through a microphone 1488, and may check data corresponding to the detected ultrasonic signal.

The display 1460 includes a panel 1462, a hologram device 1464, and a projector 1466.

For example, the panel 1462 may be implemented to be flexible, transparent, or wearable. The panel 1462 and the touch panel 1452 may be integrated into a single module.

The hologram device 1464 may display a stereoscopic image in a space using a light interference phenomenon.

The projector 1466 may project light onto a screen so as to display an image. The screen may be arranged inside or outside the electronic device 1401.

The display 1460 may further include a control circuit for controlling the panel 1462, the hologram device 1464, and/or the projector 1466.

The interface 1470 includes a high-definition multimedia interface (HDMI) 1472, a universal serial bus (USB) 1474, an optical interface 1476, or a D-subminiature (D-sub) 1478. Additionally or alternatively, the interface 1470 may include a mobile high definition link (MHL) interface, a SD card/multi-media card (MMC) interface, or an infrared data association (IrDA) standard interface.

The audio module 1480 may convert a sound and an electrical signal in dual directions. The audio module 1480 may process sound information that is input or output through a speaker 1482, a receiver 1484, an earphone 1486, and/or the microphone 1488.

The camera module 1491 captures still images and/or video and may include at least one image sensor (e.g., a front sensor or a rear sensor), a lens, an image signal processor (ISP), and a flash (e.g., an LED or a xenon lamp).

The power management module 1495 may manage, for example, power of the electronic device 1401. The power management module 1495 may include a power management integrated circuit (PMIC), a charger IC, or a battery gauge. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, etc.

The battery gauge may measure, for example, a remaining capacity of the battery 1496 and a voltage, current, or temperature thereof, while the battery 1496 is charged. The battery 1496 may include a rechargeable battery or a solar battery.

The indicator 1497 may display a specific state of the electronic device 1401 or a part thereof (e.g., a processor 1410), such as a booting state, a message state, a charging state, etc.

The motor 1498 may convert an electrical signal into a mechanical vibration and may generate vibrations and/or haptic effects.

A processing device (e.g., a GPU) for supporting mobile TV may be included in the electronic device 1401. The processing device for supporting mobile TV may process media data according to the standards of DMB, digital video broadcasting (DVB), MediaFlo™, etc.

Each of the above-described elements of the electronic device 1401 may be configured with one or more components, and the names of the elements may be changed according to the type of the electronic device 1401. Further, the electronic device 1401 may omit some of the elements thereof or may further include other element(s).

Further, some of the elements of the electronic device 1401 may be combined with each other in order to form one entity, so that the functions of the elements may be performed in the same manner as before the combination.

Figure 15:
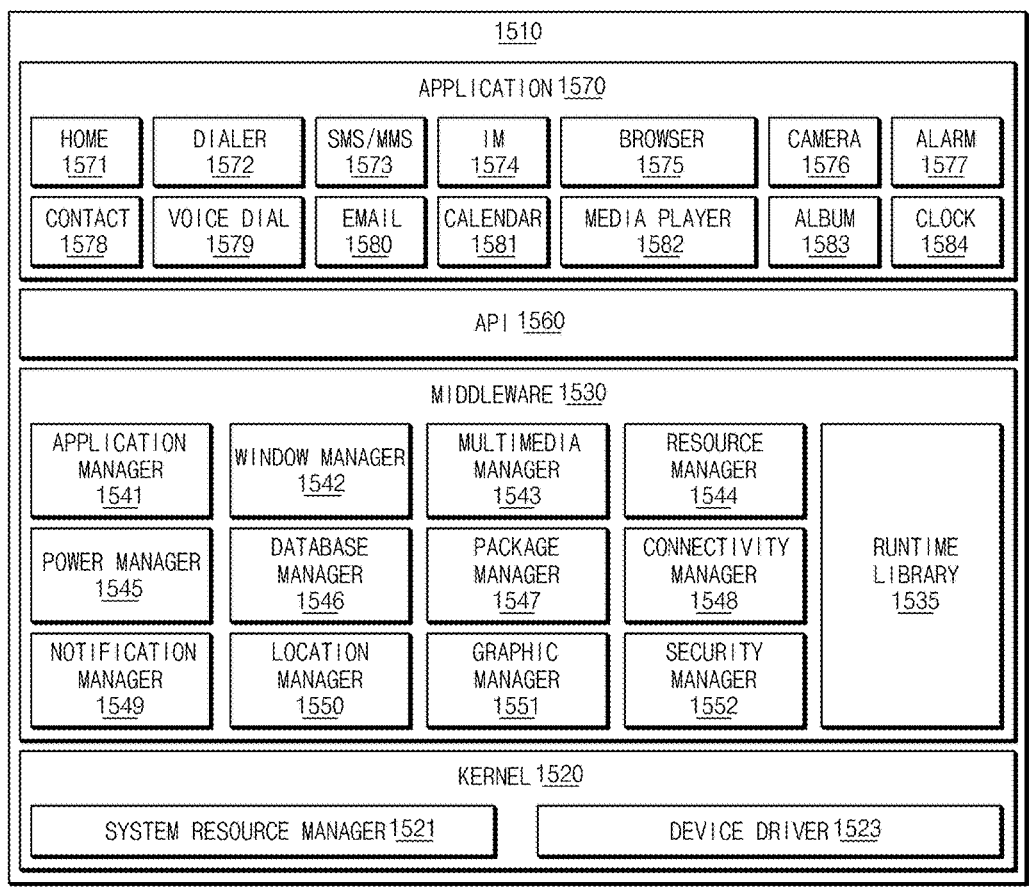
FIG. 15 illustrates a program module according to an embodiment of the present disclosure.

FIG. 15 illustrates a program module according to an embodiment of the present disclosure.

Referring to FIG. 15, a program module 1510 may include an OS to control resources associated with an electronic device, and/or diverse applications driven on the OS.

The program module 1510 includes a kernel 1520, a middleware 1530, an API 1560, and applications 1570. At least a part of the program module 1510 may be preloaded on an electronic device or may be downloadable from an external electronic device.

The kernel 1520 includes a system resource manager 1521 and a device driver 1523. The system resource manager 1521 may perform control, allocation, or retrieval of system resources. The system resource manager 1521 may include a process managing part, a memory managing part, or a file system managing part.

The device driver 1523 may include a display driver, a camera driver, a Bluetooth driver, a common memory driver, an USB driver, a keypad driver, a Wi-Fi driver, an audio driver, and/or an inter-process communication (IPC) driver.

The middleware 1530 may provide a function which the application 1570 needs in common or may provide diverse functions to the application 1570 through the API 1560 to allow the applications 1570 to efficiently use limited system resources of the electronic device. The middleware 1530 includes a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, and a security manager 1552.

The runtime library 1535 may include a library module, which is used by a compiler to add a new function through a programming language, while the applications 1570 are being executed. The runtime library 1535 may perform input/output management, memory management, or capacities about arithmetic functions.

The application manager 1541 may manage a life cycle of at least one of the applications 1570.

The window manager 1542 may manage a GUI resource which is used in a screen.

The multimedia manager 1543 may identify a format for playing media files, and may perform encoding or decoding of media files by using a codec suitable for the format.

The resource manager 1544 may manage resources, such as a storage space, memory, or source code of at least one of the applications 1570.

The power manager 1545 may operate with a basic input/output system (BIOS) to manage a battery or power, and may provide power information for an operation of an electronic device.

The database manager 1546 may generate, search for, or modify a database to be used in at least one of the applications 1570.

The package manager 1547 may install or update an application that is distributed in the form of a package file.

The connectivity manager 1548 may manage wireless connection, such as Wi-Fi or Bluetooth.

The notification manager 1549 may display or notify an event such as arrival message, promise, or proximity notification.

The location manager 1550 may manage location information of an electronic device.

The graphic manager 1551 may manage a graphic effect that is provided to a user, or manage a user interface relevant thereto.

The security manager 1552 may provide a general security function for system security or user authentication.

When an electronic device includes a telephony function, the middleware 1530 may further include a telephony manager for managing a voice or video call function of the electronic device.

The middleware 1530 may include a middleware module that combines diverse functions of the above-described elements. The middleware 1530 may provide a module specialized to each type of OS to provide differentiated functions. In addition, the middleware 1530 may remove a part of the preexisting elements, dynamically, or may add new elements thereto.

The API 1560 may be a set of programming functions and may be provided with a configuration that is variable depending on an OS. For example, when an OS is Android® or iOS®, it may be permissible to provide one API set per platform. When an OS is Tizen®, it may be permissible to provide two or more API sets per platform.

The applications 1570 include a home application 1571, a dialer application 1572, an SMS/MMS application 1573, an instant message (IM) application 1574, a browser application 1575, a camera application 1576, an alarm application 1577, a contact application 1578, a voice dial application 1579, an e-mail application 1580, a calendar application 1581, a media player application 1582, an album application 1583, and a clock application 1584. Additionally, the applications 1570 may include a health care application (e.g., an application for measuring exercise or blood sugar) or an environment information application (e.g., an application that utilizes atmospheric pressure, humidity, or temperature).

The applications 1570 may include an information exchanging application that supports information exchange between the electronic device and an external electronic device. The information exchanging application may include a notification relay application for transmitting specific information to the external electronic device, or a device management application for managing the external electronic device.

For example, the information exchanging application may include a function of transmitting notification information, which arise from other applications (e.g., the SMS/MMS application 1573, the e-mail application 1580, the health care application, or the environmental information application), to an external electronic device.

Additionally, the information exchanging application may receive notification information from an external electronic device and provide the notification information to a user.

A device management application may manage (e.g., install, delete, or update) at least one function (e.g., turn-on/turn-off of an external electronic device itself (or a part of components) or adjustment of brightness (or resolution) of a display) of the external electronic device, which communicates with the electronic device, an application running in the external electronic device, or a service (e.g., a call service, a message service, etc.) provided from the external electronic device.

The applications 1570 may include an application (e.g., a health care application of a mobile medical device, etc.) which is assigned in accordance with an attribute of the external electronic device.

The applications 1570 may include an application that is received from an external electronic device.

The applications 1570 may include a preloaded application or a third party application that is downloadable from a server.

The element titles of the program module 1510 may be modified depending on the types of OSs.

At least a part of the program module 1510 may be implemented by software, firmware, hardware, or a combination of two or more thereof. At least a part of the program module 1510 may be implemented (e.g., executed), for example, by a processor.

At least a part of the program module 1510 may include modules, programs, routines, sets of instructions, or processes, etc., for performing one or more functions.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

Herein, the term "module" may represent a unit including one or more combinations of hardware, software and firmware. The term "module" may be interchangeably used with the terms "unit", "logic", "logical block", "component" and "circuit".

A "module" may be a minimum unit of an integrated component or may be a part thereof. A "module" may be a minimum unit for performing one or more functions or a part thereof. A "module" may be implemented mechanically or electronically. For example, a module may include at least one of an application-specific IC (ASIC) chip, a field-programmable gate array (FPGA), and a programmable-logic device for performing some operations.

At least a part of an apparatus (e.g., modules or functions thereof) or a method (e.g., operations) according to various embodiments of the present disclosure may be implemented by instructions stored in a computer-readable storage media in the form of a program module. If the instructions are executed by a processor (e.g., a control module 1040), the one or more processors may perform functions corresponding to the instructions.

A computer-readable recording medium may include a hard disk, a magnetic media, a floppy disk, a magnetic media (e.g., a magnetic tape), an optical media (e.g., a compact disc read only memory (CD-ROM) and a DVD, a magneto-optical media (e.g., a floptical disk), and hardware devices (e.g., a ROM, a RAM, or a flash memory). Also, a program instruction may include not only a mechanical code such as things generated by a compiler but also a high-level language code executable on a computer using an interpreter. The above-mentioned hardware device may be configured to operate as one or more software modules to perform operations according to various embodiments of the present disclosure, and vice versa.

Modules or program modules according to various embodiments of the present disclosure may include at least one or more of the above-mentioned elements, some of the above-mentioned elements may be omitted, or other additional elements may be further included therein. Operations executed by modules, program modules, or other elements may be executed by a successive method, a parallel method, a repeated method, or a heuristic method. Also, a part of operations may be executed in different sequences, omitted, or other operations may be added.

According to various embodiments of the present disclosure, a user verifies a list and state of a device using the same phone number. A user may change a device making a call based on a situation of a user through a call transfer function and may conveniently manage a plurality of devices using a function that limits the reception of a call.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
a display;
a transceiver; and
a processor configured to:
control the transceiver to receive, from a communication server, a first message including a first subscription information and call state information, wherein the call state information indicates a state of a call between a first external electronic device and a second external electronic device, and wherein the second external electronic device uses a same subscription information as the electronic device;
control the transceiver to receive, from the communication server, a second message inviting a call based on a request of the first external electronic device, wherein the second message comprises a second subscription information;
compare the second subscription information with the first subscription information;
based on that the second subscription information is equal to the first subscription information, establish the call between the electronic device and the first external electronic device; and
display, on the display, a user interface indicating a state of a call between the electronic device and the first external electronic device using the call state information.

2. The electronic device of claim 1, wherein the processor is further configured to display, on the display, a user interface for receiving a call accepting command, based on that the second subscription information is different from the first subscription information.

3. The electronic device of claim 1, wherein the processor is further configured to
compare the first subscription information or a first device identification information included in the first message with the second subscription information or a second device identification information included in the second message, based on that the received first message indicates that a call transfer of the call between the first external electronic device and the second external electronic device is scheduled, and
establish the call between the electronic device and the first external electronic device, based on that the first subscription information or the first device identification information is the same as the second subscription information or the second device identification information.

4. A method of an electronic device, the method comprising:
receiving, from a communication server, a first message including a first subscription information and call state information, wherein the call state information indicates a state of a call between a first external electronic device and a second external electronic device, and wherein the second external electronic device uses a same subscription information as the electronic device;
receiving, from the communication server, a second message inviting a call based on a request of the first external electronic device, wherein the second message comprises a second subscription information;
comparing the second subscription information with the first subscription information; and
based on that the second subscription information is equal to the first subscription information, changing the call between the first external electronic device and the second external electronic device to a call between the electronic device and the first external electronic device; and
displaying, on a display, a user interface indicating a state of the call between the electronic device and the first external electronic device using the call state information.

5. The method of claim 4, further comprising displaying a user interface for receiving a call accepting command, based on that the second subscription information is different from the first subscription information.

* * * * *